US007374803B2

(12) United States Patent
Tabuchi et al.

(10) Patent No.: US 7,374,803 B2
(45) Date of Patent: May 20, 2008

(54) BAND-LIKE MATTER FASTENING SEAL, ROLL PHOTO FILM, APPARATUS AND METHODS FOR MANUFACTURING A BAND-LIKE MATTER UNIT

(75) Inventors: Masaharu Tabuchi, Kanagawa (JP); Takashi Komine, Kanagawa (JP); Yukio Seto, Kanagawa (JP); Hironori Sasaki, Kanagawa (JP); Akihiro Sanda, Kanagawa (JP); Nobuo Sugiyama, Kanagawa (JP); Yasuko Sano, Kanagawa (JP); Naoki Yoshikawa, Kanagawa (JP); Mototada Yasui, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 341 days.

(21) Appl. No.: 10/143,863

(22) Filed: May 14, 2002

(65) Prior Publication Data

US 2002/0168598 A1 Nov. 14, 2002

(30) Foreign Application Priority Data

| | | | |
|---|---|---|---|
| May 14, 2001 | (JP) | ............................ | 2001-143854 |
| May 22, 2001 | (JP) | ............................ | 2001-153161 |
| Jul. 11, 2001 | (JP) | ............................ | 2001-211265 |
| Sep. 14, 2001 | (JP) | ............................ | 2001-280446 |

(51) Int. Cl.
*B32B 7/14* (2006.01)
*G03C 3/02* (2006.01)

(52) U.S. Cl. ...................... 428/42.2; 428/42.3; 428/43; 428/136; 428/19; 428/41.8; 428/906; 428/121; 428/124; 428/126; 428/40.1; 242/348.4; 206/398; 206/401; 206/411; 206/410; 206/400; 430/501; 396/511

(58) Field of Classification Search .................. 428/43, 428/136, 119, 41.8, 40.1, 906, 121, 124, 126, 428/19, 42.2, 42.3; 206/398, 401, 400, 411, 206/410; 396/511; 430/501; 242/348.4
See application file for complete search history.

(56) References Cited

U.S. PATENT DOCUMENTS

| | | | | |
|---|---|---|---|---|
| 1,897,429 | A * | 2/1933 | Hipke | 242/348.4 |
| 2,630,385 | A * | 3/1953 | Wolff | 430/500 |
| 3,022,170 | A * | 2/1962 | Flinchbaugh et al. | 430/501 |
| 3,099,560 | A * | 7/1963 | Kouri | 430/501 |

(Continued)

FOREIGN PATENT DOCUMENTS

JP 10-10483 1/1998

(Continued)

*Primary Examiner*—William P Watkins, III
(74) *Attorney, Agent, or Firm*—Sughrue Mion, PLLC

(57) ABSTRACT

A band-like matter fastening seal for fixing a wound end of a band-like matter that is wound in a roll form to the body of said band-like matter, includes: a first attaching part adhered to said end of the band-like matter; a second attaching part having an attaching side adhered to the body of the matter in order to fasten the end to the body of the matter; and a handle part extended from the second attaching part, the attaching side being exposed when the attaching side is lifted from a masking side covering the attaching side, wherein the handle part rises up along the tangent line of the roll when a portion of the band-like matter fastening seal in the vicinity of the handle part is curved.

8 Claims, 31 Drawing Sheets

U.S. PATENT DOCUMENTS

| | | | | |
|---|---|---|---|---|
| 4,902,141 | A * | 2/1990 | Linnewiel | 383/61.1 |
| 5,353,933 | A * | 10/1994 | Takahashi et al. | 206/398 |
| 5,824,380 | A * | 10/1998 | Hagen | 428/41.9 |
| 6,100,017 | A * | 8/2000 | Makino et al. | 430/501 |
| 6,257,777 | B1 * | 7/2001 | Myers et al. | 396/511 |
| 6,375,008 | B2 * | 4/2002 | Shigeta et al. | 206/397 |
| 6,436,500 | B1 * | 8/2002 | Yingst et al. | 428/40.1 |
| 6,540,077 | B2 * | 4/2003 | Yasui et al. | 206/398 |

FOREIGN PATENT DOCUMENTS

| | | |
|---|---|---|
| JP | 11-271935 | 10/1999 |

* cited by examiner

FIG. 2A
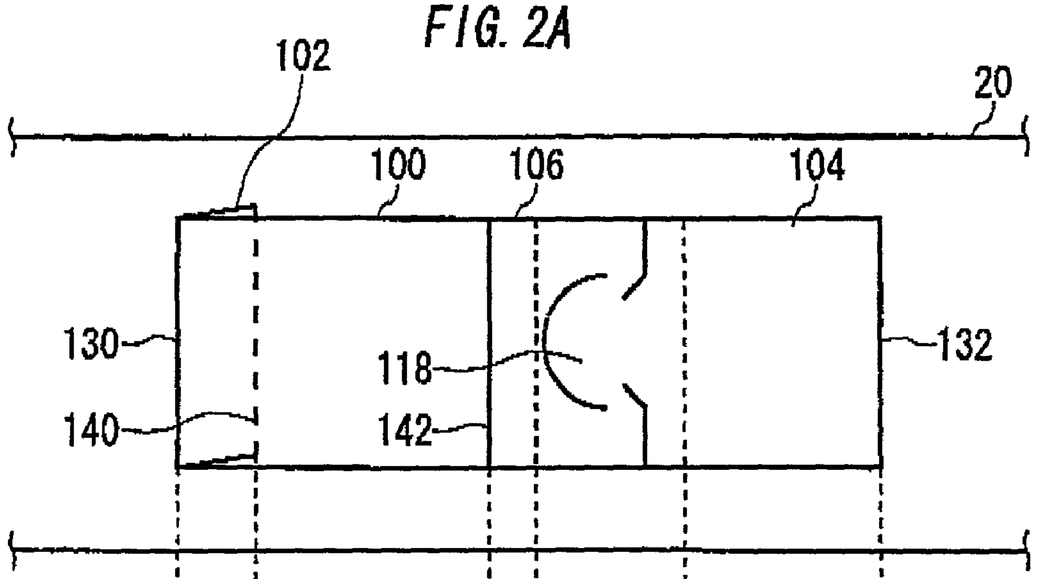
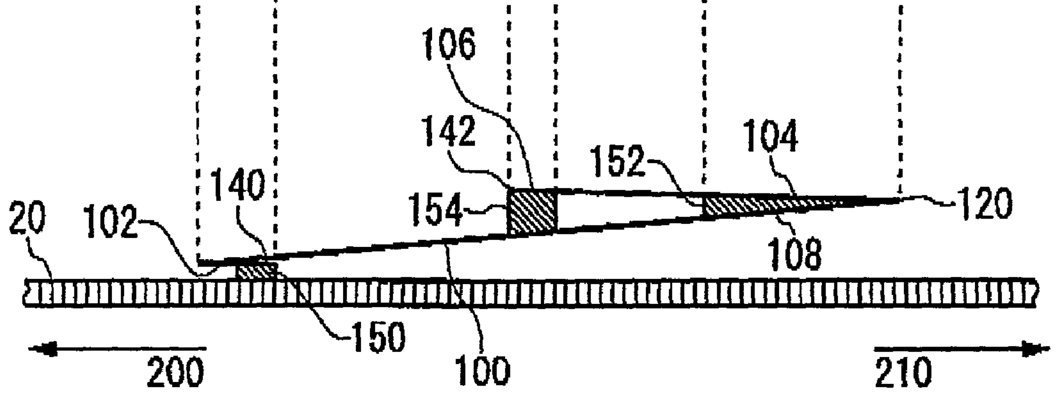
FIG. 2B

BAND-LIKE MATTER FASTENING SEAL, ROLL PHOTO FILM, APPARATUS AND METHODS FOR MANUFACTURING A BAND-LIKE MATTER UNIT

This patent application claims priority from Japanese patent application Nos. 2001-143854 filed on May 14, 2001, 2001-153161 filed on May 22, 2001, 2001-211265 filed on Jul. 11, 2001 and 2001-280446 filed on Sep. 14, 2001, the contents of which are incorporated herein by reference.

BACKGROUND OF THE INVENTION

1. Field of the Invention

The present invention relates to a band-like matter fastening seal, a roll film, and an apparatus for manufacturing a band-like matter unit. More particularly, the present invention relates to a band-like matter fastening seal that fastens the wound end of a band-like matter in a roll form, a roll photo film containing a band-like matter fastening seal, and an apparatus for manufacturing the band-like matter unit that includes a band-like matter fastening seal.

2. Description of the Related Art

The roll film of Brownie type winds the photographic film in a band form with the width of 6 cm on the spool to stop with the end of the light-shielding paper, and is known as having 120 type and 220 type.

A roll photo film is provided to user with winding back a photographic film and a light-shielding paper shielding the photographic film from the light on a spool. After taking a photograph, user adheres the band-like matter fastening seal to the wound end of the roll film so as to fix the wound end. The band-like matter fastening seal already known has used adhesives activated by the humidification. Therefore, user applies the sputa to humidify the band-like seal. However, since it is unsanitary to activate the adhesives by applying the sputa, the other method for adhesion is necessary.

Meanwhile, it is disclosed that the roll photo film wherein the cohesive layer has been inserted between the double over of the seal material in Japanese Patent Application Laying-Open No. 10-10483. And it is disclosed that the roll photo film, wherein the cohesive layer has been inserted to between seal material folded to turn in Z letter shape in Japanese Patent Application Laying-Open No. 11-271935.

If the gap between a photographic film and a light-shielding paper became appear, the light-shielding paper could not completely shield the photographic film from the light. Therefore, it is necessary the roll photo film perfectly wound back.

Also, it is necessary that the seal fasten more surely and more easily the wound end of the roll photo film.

SUMMARY OF THE INVENTION

Therefore, the object of the present invention is to provide a roll photo film and an apparatus for manufacturing the band-like unit, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a band-like matter fastening seal, adhering the wound end of a band-like matter that is wound back in a roll form to the body of corresponding band-like matter, comprises: the first attaching part adhered to the end of the band-like matter; the second attaching part having the attaching side adhered to the body of the band-like matter in order to fasten the wound end to the body of the band-like matter; and the handle part extended from the second attaching part, and exposing the attaching side when it is lifted from the masking side covering the corresponding attaching side, wherein the body of the handle part rises up along the tangent line of the roll when the vicinity of the handle part of the band-like matter fastening seal curves.

According to the second aspect of the present invention, a band-like matter fastening seal adhering the wound end of a band-like matter wound back in a roll form to the body of corresponding band-like matter comprises: the first attaching part adhered to the end of the band-like matter; the second attaching side having the attaching side adhered to the body of the band-like matter in order to fasten the wound end to the body of the band-like matter; and the handle part extended from the second attaching part and exposing the attaching side when it is lifted from the masking side covering the corresponding attaching side, wherein the handle part has the border in a free state, has the apex on the above border, and has the shape getting narrow toward the apex.

The front end of the handle part may be folded to turn toward the forward-winding direction of the band-like matter in the above first and second aspect of the present invention.

In the second aspect, the apex is preferable to be nearly center of the corresponding the handle part.

The width in the vicinity of the front end of the handle part in the roll-axis direction is preferable to be about 30% to that in both ends of the border of the handle part in the roll-axis direction in the above first and second aspect of the present invention. The border may be nearly convexo shape, may be nearly arc shape of the circle with a point of the handle side as the center, and may be nearly triangle shape with a point of the border as the apex.

The band-like matter fastening seal may include the first silt part making the handle part by tearing off a part of the body of the band-like matter fastening seal. In this case, the band-like matter fastening seal may include the third attaching part, which is constructed in the body of the band-like matter fastening seal in order not to overlap with the body of the handle part and has the attaching side adhering the periphery of the handle part. And, the end of the first slit part is not extended to the border of the corresponding band-like matter fastening seal, but the band-like matter fastening seal may include the second slit part, which unifies with the first slit part by that the band-like matter fastening seal between both slit part is torn off when the handle part is lifted up.

Furthermore, in this case, the second slit part may be constructed from the border of the corresponding band-like matter fastening seal toward inner side, and the one end of the second slit part may go to the center part past the end of the first slit part in the roll-axis direction.

Further, among the angle formed by the direction toward the terminus of the first slit part along the first slit part and the direction along the second slit part, the degree of the angle on the side of the handle part is preferable to be 30 degrees or more.

Also, among the angle formed by the direction toward the terminus of the first slit part along the first slit part and the border of the band-like matter fastening seal, the degree of the angle on the front end side of the handle part is preferable to be 60 degrees or less.

In case that the first attaching part fastens the band-like matter, the first attaching part may be adhered to the band-like matter in order that the second attaching part is placed in the outside of the wound end of the band-like matter. The second attaching part has the masking part, and the space between the attaching side of the second attaching part and the masking side may be folded to turn so as that the two sides face each other. The first attaching side may be adhered to the band-like matter in order that the margin on the side of the first attaching part is positioned on the way of the forward-winding direction from the first attaching part.

According to the third aspect of the present invention, a band-like matter fastening seal, adhering the wound end of a band-like matter that is wound back in a roll form to the body of the corresponding band-like matter, comprises: the attaching part for adhering, which is constructed in one side of the band-like matter fastening seal and adheres to fix the corresponding band-like matter fastening seal to the end of the band-like matter; the attaching part for fixing, which is constructed in the site different from the one side and the attaching part for fixing and is adhered to the body of the band-like matter in a roll form so as to wind to fasten the band-like matter; and the low frictional layer, which is constructed in a site different from the attaching part for fixing and the attaching part for adhering and is spread a lubricant on.

In the above third aspect, the band-like matter fastening seal may include the first double-over part, which is constructed between the attaching part for fixing and the attaching part for adhering, the low frictional layer may be constructed to cross the first double-over part.

The low frictional layer may be constructed in the other side opposite to said one side. In this case, the attaching part for fixing is adhered to the other side of the band-like matter fastening seal so as to wind to fasten the band-like matter, and the low frictional layer is preferable to be constructed not to overlap with the site to which the attaching part for fixing is adhered.

The thickness of the lubricant of the low frictional layer is preferable to be from 0.1 μm and more to 5 μm and less.

Further, the lubricant preferably contains silicon.

Also, the static friction coefficient between the low frictional layers is preferable to be 0.160 and less for the low frictional layer with 0.25 gf/mm$^2$ in load.

The band-like matter is, for example, the light-shielding paper that shields the film from the light.

According to the forth aspect of the present invention, a roll photo film comprises: the band-like photographic film; the spool winding back the photographic film; the light-shielding paper shielding the photographic film from the light, which is constructed in at least one end of the photographic film to be wound back on the spool with the photographic film; and the light-shielding paper fastening seal adhering the wound end of the light-shielding paper to the body of the light-shielding paper, wherein the light-shielding paper fastening seal comprises: the first attaching part adhered to the end of the light-shielding paper; the second attaching part having an attaching side adhered to the body of the light-shielding paper in order to fasten the end to the body of the light-shielding paper; and the handle part extended from the second attaching part and exposing the attaching side when the attaching side is lifted from a masking side covering the attaching side, and the handle part rises up along the tangent line of the roll when the vicinity of the handle part of the light-shielding paper fastening seal is curved.

In the above forth aspect, the corresponding roll photo film is mounted on the photographic apparatus, which comprises the mounting part mounting the roll photo film, the winding part winding back the roll photo film mounted on the mounting part, and the film guide constructed in the mounting part and pressing the roll photo film mounted on the mounting part into the spool, the second attaching part has the masking part, and the space between the attaching side of the second attaching part and the masking side is folded to turn so as that the two sides face each other, the first attaching part is adhered to the site of the light-shielding paper, on which the edge of folding to turn in the corresponding light-shielding paper fastening seal contacts with at least one side of the film guide, the light-shielding paper fastening seal is wound toward the direction, to which the winding part winds forward the edge of folding to turn, the edge of folding to turn may be folded to turn toward opposite to the forward-winding direction with relation to the film guide when the light-shielding paper fastening seal mounted on the camera is carried out to the winding part.

According to the fifth aspect of the present invention, a band-like matter fastening seal adhering the wound end of a band-like matter wound back in a roll form to the body of the corresponding band-like matter comprises: the attaching part adhered to the end of the band-like matter; and the first free border which is not fixed to the band-like matter fastening seal in the pre-use state for the corresponding band-like matter fastening seal, wherein the first free border is molded in the site of the band-like matter which faces to the end of the corresponding free border, in order to look to the nearly tangent-line direction of the roll when the attaching part is adhered to the band-like matter in a roll form.

In the above fifth aspect, the band-like matter fastening seal may include the double-over part, which is located on the end of first free border and folds to turn the site except the attaching part of the band-like fastening seal, the first free border is preferable to be the surface of the roll, which is folded inside out by the double-over part.

The first free border may have the first folding trace part in the vicinity of the end, which folds to curve the corresponding band-like matter fastening seal with projecting over the surface. In this case, the band-like matter fastening seal may include the second free border, which is extended from the double-over part and located on the site facing to the first free border, the first double-over part may be constructed in the site facing to the second free border. And, the band-like matter fastening seal may include the second free border, which is extended from the double-over part and located on the site facing to the first free border, the second free border may have the second folding trace part in the site facing to the first double-over part, which folds to curve the corresponding band-like matter fastening seal with projecting over the surface corresponding to the first folding trace part. Further, the first folding trace part may be constructed to be parallel to the axis of the roll.

According to the sixth aspect of the present invention, a roll photo film comprises: the band-like photographic film; the spool winding back the photographic film; the light-shielding paper shielding the photographic film from the light, which is constructed in one or both end of the photographic film to be wound back on the spool with the photographic film; and the light-shielding paper fastening seal adhering the wound end of the light-shielding paper to the body of the light-shielding paper, wherein the light-shielding paper fastening seal comprises: the attaching part adhered to the end of the band-like matter; and the first free border which is not fixed to the band-like matter fastening seal as long as the corresponding band-like matter fastening seal doesn't start being used, the first free border is molded in the site of the band-like matter which faces to the end of the corresponding free border, in order to look to the nearly tangent-line direction of the roll when the attaching part is adhered to the band-like matter in a roll form.

In the above sixth aspect, the first free border may include the first folding trace part in the vicinity of the end, which folds to curve the corresponding band-like matter fastening seal with projecting over the surface, and the light-shielding paper has the light-shielding paper folding trace part in the site facing to the folding trace part, which folds to curve the corresponding light-shielding paper with projecting over the surface corresponding to the first folding trace part.

According to the seventh aspect of the present invention, an apparatus for manufacturing of the band-like matter unit comprises: the free border molding part which molds the band-like matter fastening seal in order that the first free border looks to the nearly tangent-line direction of the roll in the site facing to the end of the corresponding free border, when the attaching part is adhered to the band-like matter in a roll form; and the winding part which winds back the band-like matter fastening seal settled on the light-shielding paper such that the end of the free border molded by the free border molding part directs to the forward-winding direction of the roll with the band-like matter, wherein said band-like matter unit is fixed the band-like matter fastening seal, which has the attaching part adhering the wound end of the band-like matter in a roll form to the body of the corresponding band-like matter, and the first free border which is not fixed to the band-like matter fastening seal at least in a pre-use state, to the band-like matter.

In the above seventh aspect, the band-like matter fastening seal is nearly rectangular shape, the apparatus for manufacturing of the band-like matter unit may include the seal transporting part, which conveys the band-like matter fastening seal to the short plane direction of the band-like matter fastening seal, and the seal transporting part may place the band-like matter fastening seal on the site where the free border molding part molds the band-like matter fastening seal. In this case, the apparatus for manufacturing of the band-like matter unit may include the position-determining guide that determines the position of at least one plane from the short plane of the band-like matter, when the seal transporting part conveys the band-like matter fastening seal.

The free border molding part may fold to curve the vicinity of the free border of the band-like matter fastening seal with projecting over the outer side of the roll when the corresponding band-like matter fastening seal is wound back on the roll.

The free border molding part may include: the first block having the sectional side in a concave shape; and the second block having the sectional side in a convexo shape corresponding to the concave side on the site opposite to the first block, the band-like matter fastening seal may be inserted between the sectional side in a concave shape of the first block and the sectional side in a convexo shape of the second block, so as to be folded to curve. In this case, the first block and the second block may respectively have the sectional side in the V letter shape. Further, the seal transporting part may convey the band-like matter fastening seal in order that the border of the corresponding band-like matter fastening seal contacts to a edge of the V letter shape when the band-like matter fastening seal is inserted between the first block and the second block. And, the distance from the apex where two edges of the V letter shape to the end of the edge where the border of the band-like matter fastening seal is settled may be shorter that that from the apex to the end of the edge where the border of the band-like matter fastening seal is not settled.

The apparatus for manufacturing of the band-like matter unit may include the seal transporting part which conveys the band-like matter fastening seal on the band-like matter, the free border molding part may mold simultaneously the band-like matter fastening seal and the band-like matter with the band-like matter fastening seal is settled on the band-like matter.

The attaching part has hot melt adhesive agent, the apparatus for manufacturing of the band-like matter unit may include the heater part which heats the free border and the attaching part when the free border molding part molds the free border.

According to the eighth aspect of the present invention, an apparatus for manufacturing of the band-like matter unit, manufactures the band-like matter unit by fixing the band-like matter fastening seal, which has the attaching part adhered to the wound end of the band-like matter in a roll form, and the first free border which is not fixed to the band-like matter fastening seal at least in a pre-use state, and which fastens the end to the body of the corresponding band-like matter by adhering the free border to the body of the band-like matter, to the band-like matter, a adhesive or cohesive agent is applied to the attaching part of the band-like matter, the corresponding apparatus for manufacturing of the band-like matter unit comprises: the first block; and the second block opposite to the first block, which inserts the attaching part and the band-like matter with overlapping between both blocks so as to adhere the attaching part to the end of the band-like matter, and at least one of the first block and the second block has the convexo part in the side where the attaching part and the band-like matter are inserted.

In the above eighth aspect, the adhesive or cohesive agent of the attaching part is hot melt adhesive agent, the second block has the heat source, and may insert the attaching part and the band-like matter with overlapping between both blocks so as to adhere the attaching part to the end of the band-like matter by applying heat to the hot melt adhesive agent.

The one of the first block and the second block may have the consecutive plurality of the convexo-concave in at least part of the side where the attaching part and the band-like matter are inserted.

According to the ninth aspect of the present invention, an apparatus for manufacturing of the band-like matter unit manufactures the band-like matter unit having the band-like matter in a roll form and the band-like matter fastening seal adhering the wound end of the band-like matter wound back in a roll form to the body of the corresponding band-like matter, uses the band-like matter fastening seal as the band-like matter fastening seal, which comprises: the attaching part for adhering, which is constructed in one side of the band-like matter fastening seal, has a adhesive or cohesive agent, and adheres to fix the corresponding band-like matter fastening seal to the end of the band-like matter; the attaching part for fixing, which is constructed in the site different from the one side and the attaching part for fixing, has a adhesive or cohesive agent, and is adhered to the body of the band-like matter in a roll form so as to wind to fasten the band-like matter; the first double-over part, which is constructed in the site different from the attaching part for fixing and folds to turn the corresponding band-like fastening seal; and the provisional fixing part which is constructed in the side opposite to the one side, has a adhesive or cohesive agent, provisionally adheres at least a section between the attaching part for adhering and the attaching part for fixing to the end of the band-like matter, and is removed from the end at the time of fastening, as said band-like matter fastening seal, furthermore, the apparatus for manufacturing of the band-like matter unit comprises: the seal attaching part which presses the attaching part into the end of the band-like matter and adheres to fix to the end; and the seal provisional fixing part which the fixing part into the band-like matter and provisionally adheres to the band-like matter.

In the above ninth aspect, the adhesive or cohesive agent of the attaching part is hot melt adhesive agent, and the seal attaching part may include: the first block; and the second block opposite to the first block, which the heat source and inserts the attaching part and the band-like matter with overlapping between both blocks so as to adhere the attaching part to the end of the band-like matter by applying heat to the hot melt adhesive agent.

Since the first block and second block insert the attaching part, the provisional fixing part, and the band-like matter between them, the first block and second block may adhere the provisional fixing part with applying heat to the hot melt adhesive agent. In this time, the one of the first block and second block may have the convexo part in the site opposite to the provisional fixing part. Further, the other of the first block and second block may have the concave part corresponding to the convexo part. And, the adhesive or cohesive agent of the provisional fixing part is hot melt adhesive agent, the second block may provisionally adhere the provisional fixing part to the band-like matter by applying heat to the hot melt adhesive agent of the provisional fixing part.

The provisional fixing part may include: the first block; and the second block opposite to the first block, which inserts the provisional fixing part and the band-like matter with overlapping between both blocks so as to provisionally adhere the provisional fixing part to the band-like matter, and, at least one of the first block and the second block may have the concave part without contacting to the other in parts of the side opposite to the provisional fixing part.

According to the tenth aspect of the present invention, a method for manufacturing of the band-like matter unit manufactures the band-like matter unit by fixing the band-like matter fastening seal, which has the attaching part adhered to the wound end of the band-like matter in a roll form, and the first free border which is not fixed to the band-like matter fastening seal at least in a pre-use state, and which fastens the end to the body of the corresponding band-like matter by adhering the free border to the body of the band-like matter, to the band-like matter, wherein the adhesive or cohesive agent is applied to the attaching part of the band-like matter, and the corresponding method comprises the step of inserting the attaching part and the band-like matter with overlapping between the first block and the second block, which is opposite to the first block, has the convexo part in the opposite side, and adheres the attaching part to the end of the band-like matter.

According to the eleventh aspect of the present invention, a method for manufacturing of the band-like matter unit having the band-like matter in a roll form and the band-like matter fastening seal adhering the wound end of the band-like matter wound back in a roll form to the body of the corresponding band-like matter, uses the band-like matter fastening seal comprising: the attaching part for adhering, which is constructed in one side of the band-like matter fastening seal, has a adhesive or cohesive agent, and adheres to fix the corresponding band-like matter fastening seal to the end of the band-like matter; the attaching part for fixing, which is constructed in the site different from the one side and the attaching part for fixing, has a adhesive or cohesive agent, and is adhered to the body of the band-like matter in a roll form so as to wind to fasten the band-like matter; the first double-over part, which is constructed in the site different from the attaching part for fixing and folds to turn the corresponding band-like fastening seal; and the provisional fixing part which is constructed in the side opposite to the one side, has a adhesive or cohesive agent, provisionally adheres at least a section between the attaching part for adhering and the attaching part for fixing to the end of the band-like matter, and is removed from the end at the time of fastening, the corresponding method comprises: the step of adhering the seal, that is, pressing the attaching part into the end of the band-like matter and adhering to fix to the end; and the step of provisional fixing the seal, that is, pressing the seal provisional fixing part into the band-like matter and provisionally adhering to the band-like matter.

In the above eleventh aspect, the provisional fixing part of the band-like matter fastening seal has the adhesive or cohesive agent on the appropriate section, the step of the provisional fixing may be to press parts of the appropriate section to the band-like matter so as to provisionally adhere.

According to the twelfth aspect of the present invention, a method for manufacturing of the band-like matter unit, having the attaching part adhering the wound end of the band-like matter in a roll form to the body of the corresponding band-like matter, and the first free border which is not fixed to the band-like matter fastening seal at least in a pre-use state, to the band-like matter, comprises: the step of molding the band-like matter fastening seal in order that the first free border looks to the nearly tangent-line direction of the roll in the site facing to the end of the corresponding free border, when the attaching part is adhered to the band-like matter in a roll form; and the step of winding back the band-like matter fastening seal settled on the light-shielding paper in order that the end of the free border molded by the free border molding part looks to the forward-winding direction of the roll with the band-like matter.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIGS. 2A and 2B show the light-shielding paper fastening seal provided to user.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Furthermore, "the first double-over part" and "the first attaching part" described in the detailed description part are a respective example of "the double-over part" and "the attaching part" recited in claims. And "an apparatus for manufacturing of roll photo film" described in the detailed description part is an example of "an apparatus for manufacturing of band-like matter unit" recited in claims. And "a seal transporting board", "a light-shielding paper fastening seal attaching unit" and "a heater" described in the detailed description part are a respective example of "a seal transporting part", "a free border molding part" and "a heating part" recited in claims. The first attaching part is an example of the attaching part for adhering according the present invention, and the second attaching part is an example of the attaching part for fixing according the present invention. The first and the second block are a respective example of the seal attaching part and the seal provisional fastening part.

Figure 1:
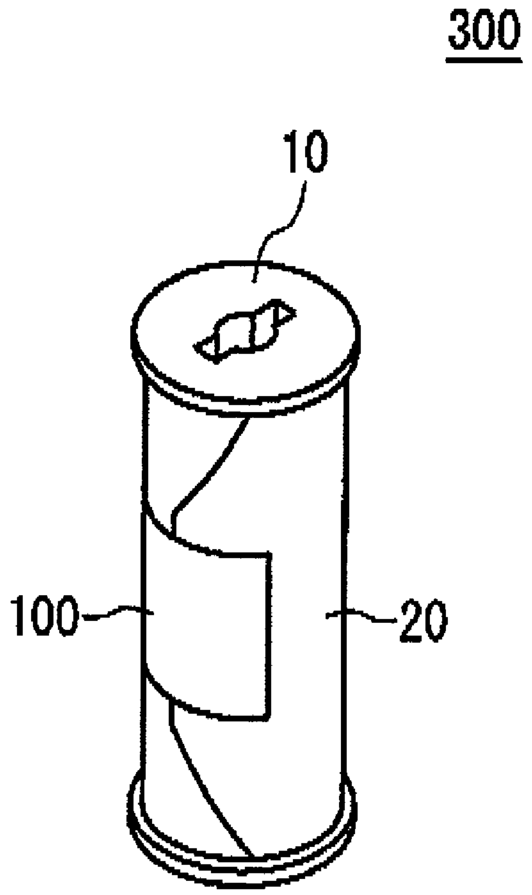
FIG. 1 is a perspective view showing the roll photo film.

FIG. 1 is a perspective view showing the whole body of the roll photo film 300 according to the first embodiment of the present invention. The roll photo film 300 is longer than the photographic film or the film for photography, and comprises the light-shielding paper 20 which covers the whole base side of the photographic film so as to shield the photographic film from the light, the first spool 10 which is wound forward the photographic film and the light-shielding paper 20, and the light-shielding paper fastening seal 100 which fastens the wounded end of the light-shielding paper 20 to the body of the light-shielding paper 20. The used photographic film is wound forward to the first spool 10. Since the photographic film is settled in the inner side of the light-shielding paper 20, it is not shown in this figure.

The photo film not yet used is provided to user with wound back on the second spool 12 different from the first spool 10. At this time, the light-shielding paper 20 and the light-shielding paper fastening seal 100 are wound back on the second spool with overlapping each other. The photographic film, the light-shielding paper 20, and light-shielding paper fastening seal 100 wound back on the second spool are mounted on a camera. While the photographing is proceed on the camera, the photographic film, the light-shielding paper 20, and light-shielding paper fastening seal 100 which are mounted on a camera are getting wound forward to the first spool 10. User extracts the photographic film, the light-shielding paper 20, and the light-shielding paper fastening seal 100 from the first spool 10. Then, the user fastens the light-shielding paper 20 by using the light-shielding paper fastening seal 100, with the light-shielding paper 20 shielding the used photographic film.

The light-shielding paper fastening seal 100 in the condition of provision to user, that is, the light-shielding paper fastening seal 100 wound back on the second spool will be described by way of FIGS. 2A to FIG. 5 as follows.

FIGS. 2A and 2B show the light-shielding paper fastening seal 100 wound back on the second spool 12. FIG. 2A is an outside elevation of the light-shielding paper fastening seal 100, with the light-shielding paper 20 wound back on the first spool 10. FIG. 2B is a cross sectional view of the light-shielding paper fastening seal 100.

As shown in FIGS. 2A and 2B, the light-shielding paper fastening seal 100 has the first border 140 and the second border 142 nearly vertical to the forward-winding direction of the first spool 210. Further, the light-shielding paper fastening seal 100 comprises the first attaching part 102 for fixing the light-shielding paper fastening seal 100 to the light-shielding paper 20, the second attaching part 104 for adhering to the body of the light-shielding paper 20 so as to fasten the light-shielding paper 20, the third attaching part 106, the first attaching side 150 settled in the first attaching part 102, the second attaching side 152 settled in the second attaching part 104, the third attaching side 154 settled in the third attaching part 106, the masking part 108 covering the second attaching side 152, the first double-over part the first double-over part 130, and the second double-over part 132. In this embodiment, the forward-winding direction of the first spool 210 is the same direction that the first spool 10 winds the light-shielding paper 20 back.

In this embodiment, the first attaching part 102 is an example of the attaching part for fixing according to the present invention, and the second attaching part 104 is an example of the attaching part for fastening according to the present invention.

The second attaching part 104 is settled in the same side but the different site in the length way with the first attaching part 102.

Also, the first attaching side 150, the second attaching side 152, and the third attaching side 154 contain adhesives or cohesive agents. For examples, EVA group or hot melt adhesives of polyester group is used as adhesives. And, the masking part 108 has a separating treatment, for examples, the insertion of a layer, such as silicon layer, hardly adhering with adhesives or cohesive agents.

The first attaching side 150 adheres to the light-shielding paper 20. That is, it is a part for adhering the light-shielding paper fastening seal 100 to the light-shielding paper 20. When the light-shielding paper 20 is wound forward to the first spool 10, the first attaching side 150 adheres to the end of the light-shielding paper 20, which is wound forward the last. Also, the first attaching side 150 adheres to the light-shielding paper 20 in order that the first margin 140 of the first attaching part 102 is positioned on the way of the forward-winding direction of the first spool 210 from the first attaching part 102.

The first double-over part the first double-over part 130 folds to turn the light-shielding paper fastening seal 100 except the first attaching part 102 toward the way of the forward-winding direction 210. And, the first double-over part the first double-over part 130 folds to turn in order that the second margin 142 is positioned on the outside. The first double-over part the first double-over part 130 is formed by folding the light-shielding paper fastening seal 100 from the first attaching part 102 to turn to the way of the second margin 142. That is, the first double-over part the first double-over part 130 is settled in the between the first attaching part 102 and the second attaching part 104, and folds to turn the light-shielding paper fastening seal 100 to overlap.

The second double-over part 132 folds to turn the second margin 142 not the masking part 108 of the light-shielding paper fastening seal 100 folded to turn toward the forward-winding direction of the first spool 210, toward the backward-winding direction of the first spool 200. At this time, the second double-over part 132 folds to turn in order that the second margin 142 is positioned on the outside. That is, the second double-over part 132 is formed by folding the second margin 142 not the masking part 108 of the light-shielding paper fastening seal 100 to turn toward the backward-winding direction of the first spool 200. In this embodiment, the backward-winding direction of the first spool 200 is the opposite direction of the forward-winding direction of the first spool 210.

After taking a photograph, the second attaching side 152 adheres to the body of the light-shielding paper 20 wound in a roll form. By the above, the end of the light-shielding paper 20 is fastened to the body of the light-shielding paper 20 wound in a roll form. The second double-over part 132 is folded to turn, so as that the masking part 108 is settled in the opposite side to the second attaching side 152. The masking part 108 is constructed not to expose the second attaching side 152. The second attaching side 152 adheres to the masking side 108 with being capable of separation. That is, in case that the site between the second attaching part 104 and the masking part 108 is folded to turn, the second attaching side 152 and the masking part 108 face each other.

The handle part 118 is extended from the second attaching part 104, and settled in the space not to contain the attaching side. The handle part 118 lifts up the second attaching part 104, and then makes the second attaching side 152 to depart from the masking side 108. That is, the handle part 118 exposes the second attaching side 152.

As the above, the handle part 118 has the attaching side, and is constructed as the same body with the second attaching part 104. Therefore, user can easily expose the second attaching side 152 of the second attaching part 104 through lifting the handle part 118.

The third attaching part 106 according to this embodiment is settled in the side of the second margin 142 and the opposite side of the first margin 140 of the light-shielding paper fastening seal 100. The third attaching part 106 has the third attaching side 154 adhering the margin of the handle part 118 to the light-shielding fastening seal 100. The third attaching part 106 is settled in the body of the light-shielding fastening seal 100 without overlapping with the body of the handle part 118.

Figure 3A:
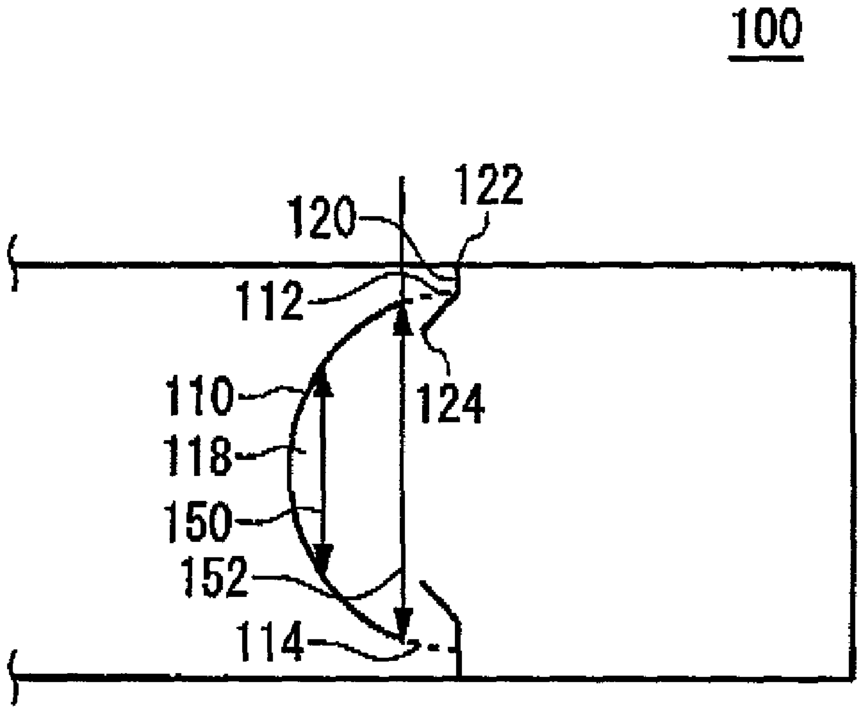
FIGS. 3A and 3B show the handle part.

FIG. 3A shows the detailed configuration for the vicinity of the handle part 118. The light-shielding paper fastening seal 100 has the first slit part 110 formed along the border of the handle part 118. The first slit part 110 tears to separate a section of the body of the light-shielding paper fastening seal 100 as the handle part 118.

The first slit part 110 is incised in a nearly convex form protruding to the front end. Further, the first slit part 110 according to this embodiment is incised in an arc form. As the above, the first slit part 110 has an apex, and gets narrow from the first terminus 112 and the second terminus 114 of the first slit part 110 toward the apex. The first slit part 110 according to this embodiment has the apex at the nearly center of the first slit part 110.

Also, the width 150 in the vicinity of the front end of the handle part 118 in the axis direction of the first spool 10 is preferable to be 30% to the width 152 of the both end of the first slit part 110, which is the border of the handle part 118, in the axis direction. As the above, the width 152 of the bottom side of the handle part 118 is constructed to be longer than the width 150 in the vicinity of the front end of the handle part 118 in the axis direction. Therefore, when the handle part 118 is lifted up, the rest section from the handle part 118 is kept from damage by physical strength applied to the handle part 118.

As the above, the handle part 118 is separated from the third attaching part 106 due to the first slit part 110. And, the first slit part 110 is not contact with the third attaching part 106. That is, the handle part 118 is held in the light-shielding paper fastening seal 100 facing each other, but is constructed in a free state. Therefore, user can easily lift the only handle part 118.

The light-shielding paper fastening seal 100 has the second slit parts 120 respectively on the line extended from the first terminus 112 and the second terminus 114. Meanwhile, the first slit part 110 is incised to the rest section of the light-shielding paper fastening seal 100. That is, the first terminus 112 and the second terminus 114 of the first slit part 110 don't reach to the border of the light-shielding paper fastening seal 100.

When the handle part 118 is lifted up, the second slit part 120 is unified with the first slit part 110 through torn off the light-shielding paper fastening seal 100 of between the first slit part 110 and the second slit part 120. The second slit part 120 is incised toward the inner section from the border of the light-shielding paper fastening seal 100, and the one terminus of the second slit part 120 goes to the center in the axis direction of the first spool 10, over the first terminus 112.

Therefore, when the handle part 118 is lifted up, if the first slit part 110 is torn off over the first terminus 112, the first slit part 110 can reach to the second slit part 120.

Figure 3B:
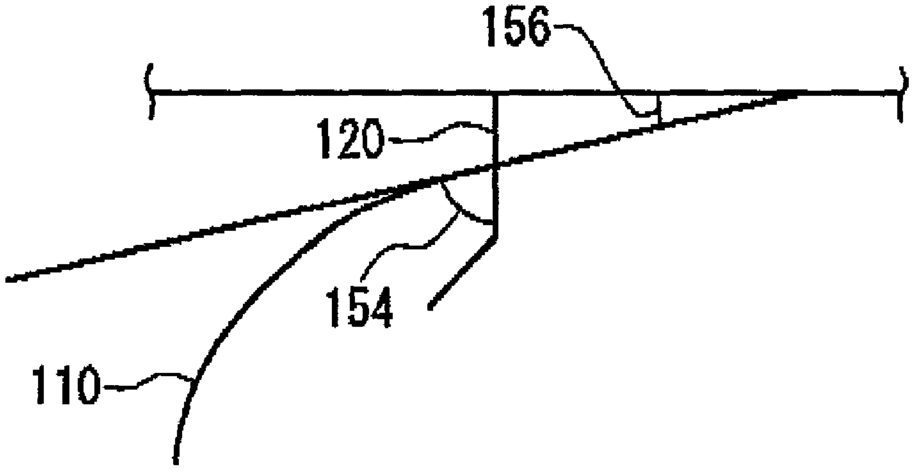

FIG. 3B shows the enlarged second slit part 120 of the FIG. 3A. The relation between the first slit part 110 and the second slit part 120 will be explained by the way of this figure. Among the angle formed by the direction toward the first terminus 112 along the first slit part 110 and the direction along the second slit part 120, the degree of the angle 154 on the side of the handle part 118 is 30 degrees or more. More preferably, the degree of the angle 154 is 60 degrees or more. Among the angle formed by the direction toward the first terminus 112 along the first slit part 110 and the border of the light-shielding paper fastening seal 100, the degree of the angle 156 on the front end side of the handle part 118 is 60 degrees or less. More preferably, the degree of the angle 156 is 30 degrees or less.

When the handle part 118 is lifted up, the light-shielding paper fastening seal 100 is torn off over the incision line of the first slit part 110 to the second slit part 120. Meanwhile, the degree of the angle between the torn line extended from the incision line of the first slit part 110, and the incision line of the second slit part 120 is restricted. Therefore, in case that the light-shielding paper fastening seal 100 is torn off over the first slit part 110, if the incision line reaches to the second slit part 120, the light-shielding paper fastening seal 100 can be torn off further along the second slit part 120 without being cleaved toward the different direction to the second slit part 120.

The second slit part 120 according this embodiment is incised from the border of the light-shielding paper fasten seal 100 in a straight line nearly parallel to the axis direction of the second spool 12, then further incised to turn toward the handle part 118 at the inner section of the handle part 118. In the other example, the second slit part 120 may be incised from the border of the light-shielding paper fastening seal 100 to the inner section of the handle part 118, with leaned to the handle part 118 from a straight line nearly parallel to the axis direction of the second spool 12. Also, in another example, the second slit part 120 may be incised from the border of the light-shielding paper fastening seal 100 to the inner section of the handle part 118, on a curved line protruding into the double-over part 132 on the side of the second attaching part.

Figure 4:
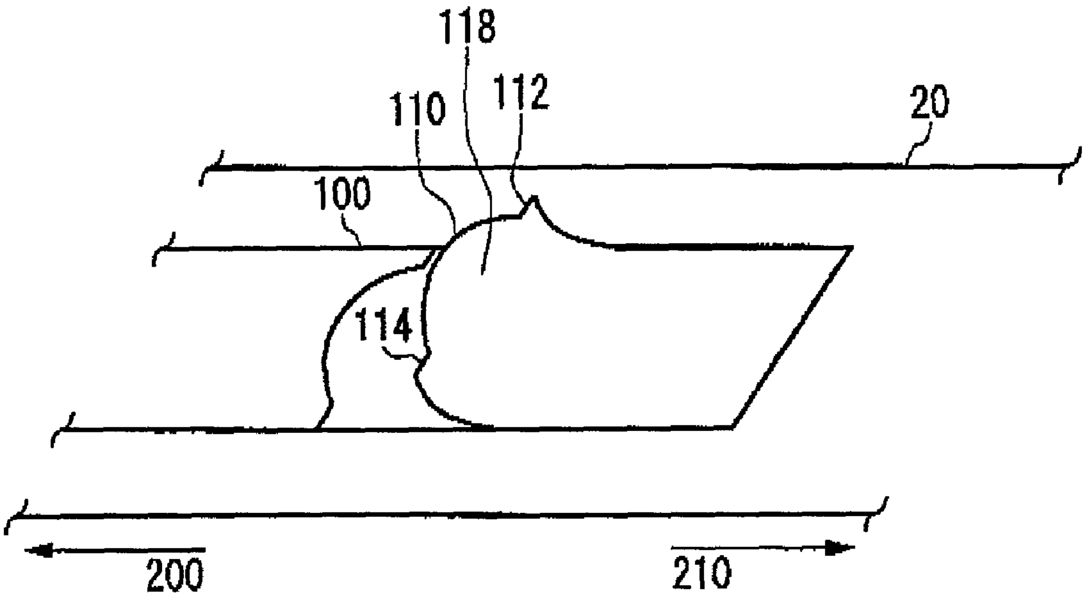
FIG. 4 shows the handle part which is lifted up.

FIG. 4 shows the handle part 118 lifted up. When user raises the handle part 118, the light-shielding paper fastening seal 100 on the side of the double-over part 132 is also lifted not only the handle part 118 by the strength of lifting. At this time, the light-shielding paper fastening seal 100 is cleaved from the first terminus 112 and the second terminus 114 of the first slit part 110 and further. And, the light-shielding paper fastening seal 100 on the side of the double-over part 132 is lifted. At this time, the incision line cleaved from the first slit part 110 reaches to the second slit part 120.

The second slit part 120 is incised to the border of the light-shielding paper fastening seal 100. Therefore, the incision line getting to the second slit part 120 reaches to the border of the light-shielding paper fastening seal 100 along the second slit part 120. At this time, it is also lifted that the whole body of the light-shielding paper fastening seal 100 on the side of the second double-over part 132, not only the second slit part 120. That is, it is lifted that the whole body of the second attaching part 104 constructed as a same body with the handle part 118.

As the above, because it is cleaved by two steps of the first slit part 110 and the second slit part 120, for examples, even though the first slit part 110 is cleaved not along the incision trace at the rest section of the first slit part 110, the incision cab reach to the border of the light-shielding paper fastening seal 100 by the second slit part 120. Therefore, user can easily raise the handle part 118 to the appropriate direction.

Figure 5A:
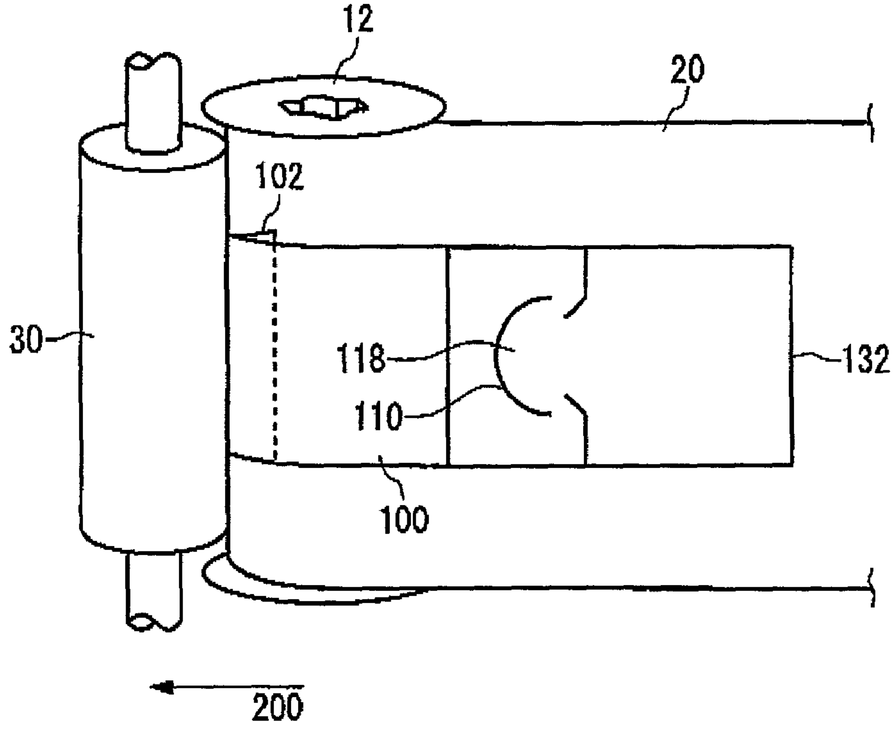
FIGS. 5A and 5B illustrate the preparation process for the roll photo film.
Figure 5B:
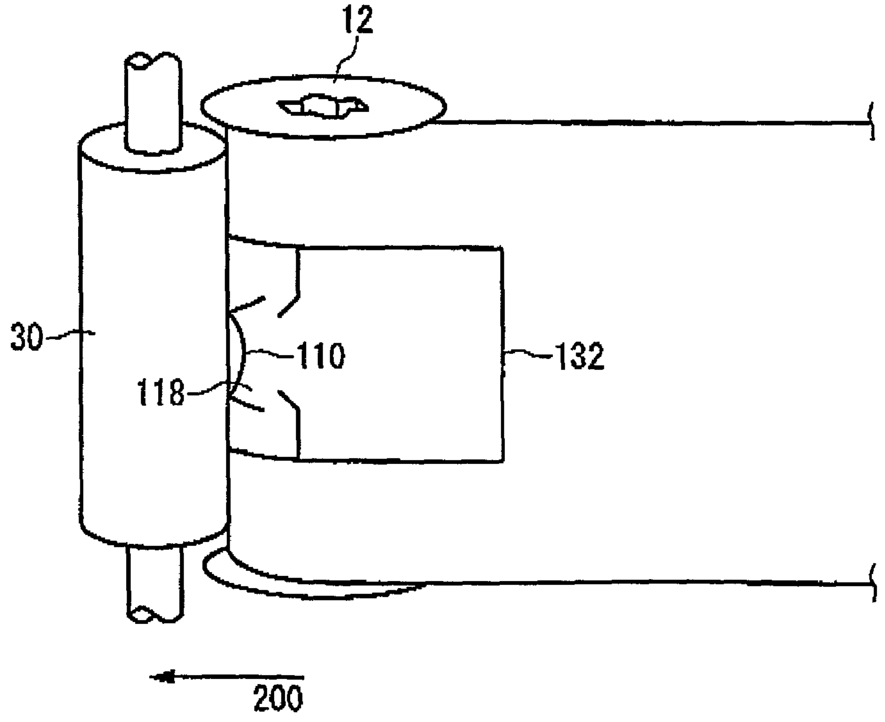

FIGS. 5A and 5B show the manufacturing process of a roll photo film. The roll photo film is provided with wound back on the second spool 12. User mounts the roll photo film wound back on the second spool 12 on a camera. According to taking a photograph, the roll photo film is wound forward to the first spool 10.

This figure illustrates the roll photo film in the process of being wound back the photographic film and the light-shielding paper 20 on the second spool 12. The pressing roll 30 pressing the photographic film and the light-shielding paper 20 against the second spool 12 is settled in the flank of the second spool 12. As the above, the second spool 12 can wound back the photographic film and the light-shielding paper 20 not to be loose.

FIG. 5A shows the roll photo film starting to be wound back the light-shielding paper fastening seal 100 adhered to the light-shielding paper 20. The light-shielding paper fastening seal 100 is wound back on the second spool 12 in the direction of wounding back the first attaching part 102 on the second spool 12, that is, the forward-winding direction of the first spool 200. That is, the first attaching part 102 of the light-shielding paper fastening seal 100 is wound back the first on the second spool 12. At this time, the light-shielding paper fastening seal 100 is also pressed against the pressing roll 30. Therefore, the second spool 12 can wind back the light-shielding paper fastening seal 100 without the light-shielding paper 20 being loose.

FIG. 5B illustrates the roll photo film being further wound back the light-shielding paper fastening seal 100 on the second spool 12 than that of FIG. 5A. The handle part 118 of this figure directly contacts with the pressing roll 30. The handle part 118 is wound on the second spool 12 with adhering to the light-shielding paper fastening seal 100 facing therewith, but is in a free state. Therefore, when the vicinity of the handle part 118 of the light-shielding paper fastening seal 100 starts to being wound back on the second spool 12, the handle part 118 curves along the second spool 12. At this time, the body of the handle part 118 rises up along the tangent line of the second spool 12. Further, the handle part 118 directly contacts to the pressing roll 30 with the front end of the handle part 118 rising up. Therefore, the front end of the handle part 118 is folded to turn to the forward-winding direction of the first spool 210. That is, when the front end of the handle part 118 is wound back on the second spool 12, the said front end is folded inside out. As the above, the front end of the handle part 118 is folded inside out in the manufacturing process, and then user is provided in that configuration. Because the front end of the handle part is folded inside out, user can easily raise the handle part 118.

Also, the front end of the handle part 118 according to this embodiment is configured in an arc form. Therefore, if the light-shielding paper fastening seal 100 in the vicinity of the handle part 118 is curved, it is started to curve in sequence from one point on the arc shape of the first slit part 110. Therefore, the pressing roll 30 can fold to turn the front end of the handle part 118 in a comfortable configuration.

Furthermore, since the first slit part 110 is constructed in an arc shape, even though any section instead of the front end rises up earlier, it rises in sequence from the one point. Therefore, the pressing roll 30 can fold to turn the front end of the handle part 118 in a comfortable configuration.

Figure 6:
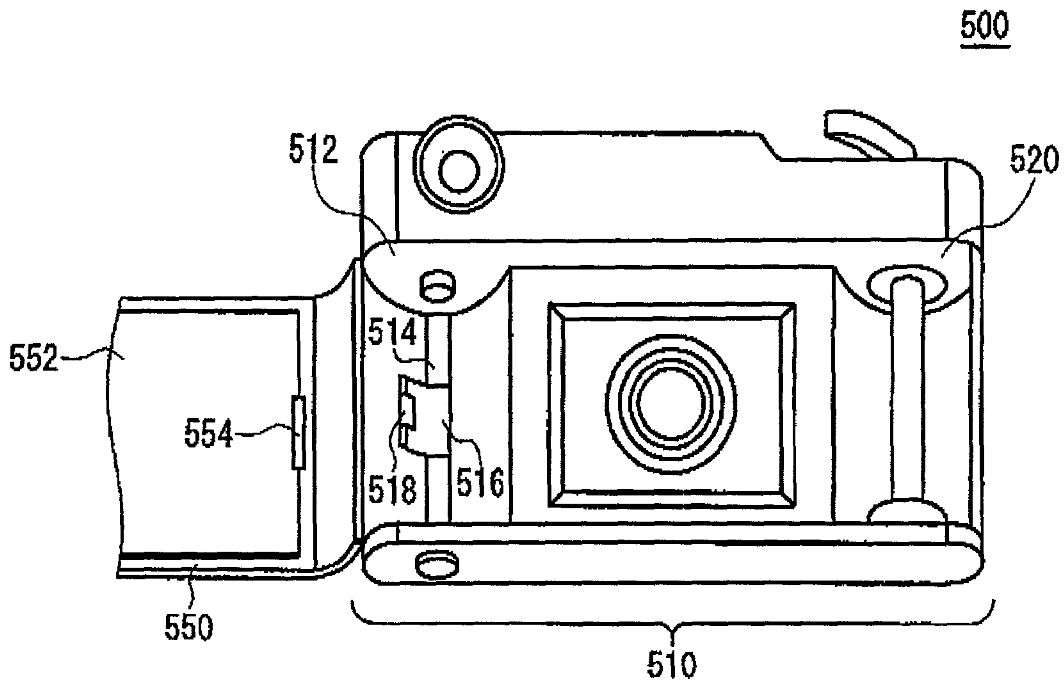
FIG. 6 is a rear elevation of the camera.

FIG. 6 is a perspective view looked a camera from the rear. It will be described the camera on which is mounted the roll photo film by the way of this figure. The cover 550 of the camera shown in this figure is opened. The camera 550 has the first spool mounting room 520 and the second spool mounting room 512 on the body 510. The second spool mounting room 512 has the second spool fixing part 514 fixing the second spool 12, the film guide part 516 pressing the light-shielding paper 20 into the axis of the second spool 12, and the first roll part the first roll 518 settled in the front end of the camera guide part 516. And, the camera 500 has the cover guide part 552 pressing the light-shielding paper 20 into the front of the camera on the side of the cover 550, and the second roll part 554 settled in the cover guide part 552.

The second spool mounting room 512 is constructed in the inner part of the body of the camera. The second spool 12 wound back the photographic film in a pre-use state is mounted on the second spool mounting room 512. The second spool mounting room 512 has the second spool fixing part 514 fixing the second spool 12, and the film guide part 516 pressing the photographic film and the light-shielding paper 20 wound back on the second spool 12 into the axis of the second spool 12. The second spool fixing part 514 may be the board spring pressing the second spool 12. The film guide part 516 has the first roll 518 on the front end. The first roll 518 presses the light-shielding paper 20 into the way of the second spool 12.

Also, the cover 550 has the cover guide 552, which guides the photographic film and the light-shielding paper 20 transported from the second spool mounting room 512 to the first spool mounting room 520. When the cover 550 is closed, the second roll part 554 of the cover guide part 552 is placed in the position of contacting with the light-shielding 20. The second roll part 554 presses the light-shielding paper 20 into the front side of the camera.

As the above, the light-shielding paper 20 is transported to the first spool 10 with pressed by the film guide part 516, the first roll 518, the cover guide part 552 and the second roll part 554. That is, the light-shielding paper 20 is transported to the first spool 10 with receiving the tension working toward the first spool 10 from the second spool 12. Therefore, the first spool 10 can wind back the light-shielding paper 20 without pulling it.

Figure 7A:
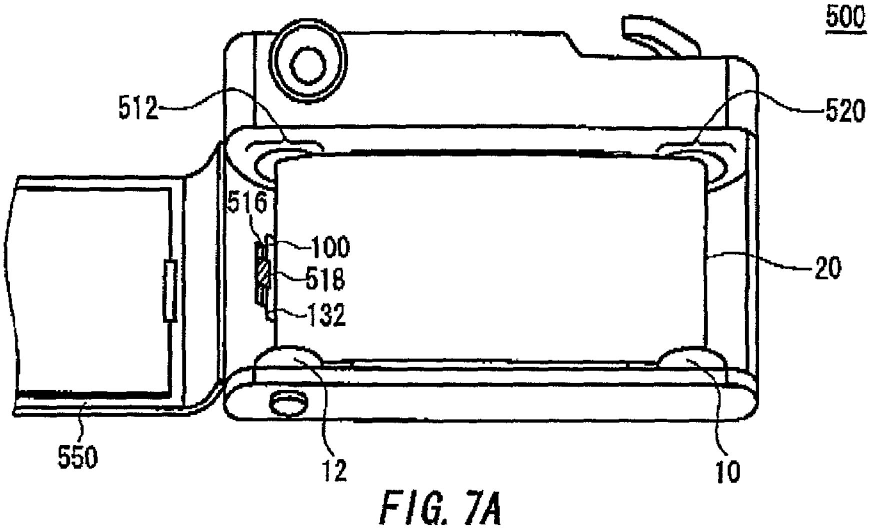
FIGS. 7A to 7C show the light-shielding paper and the light-shielding paper fastening seal mounted on the first spool mounting room.
Figure 7B:
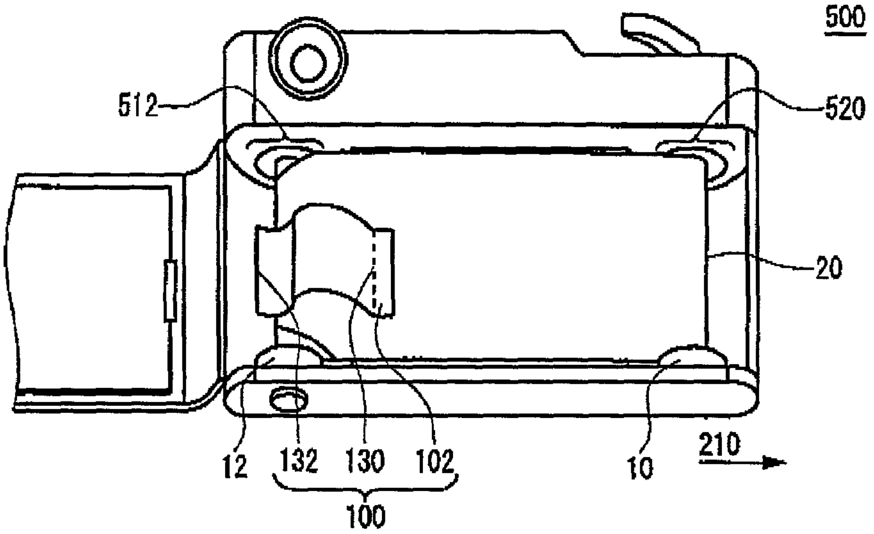
Figure 7C:
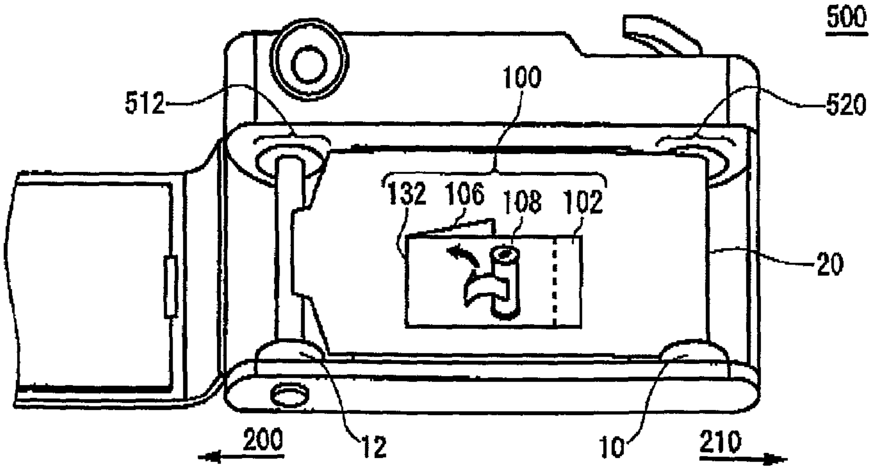

FIGS. 7A to 7C show the light-shielding paper 20 and the light-shielding paper fastening seal 100 mounted on the second spool mounting room 512. The front end of the light-shielding paper 20 is held in the first spool 10 already mounted on the first spool mounting room 520 of the camera. According to taking a photograph, the light-shielding paper 20 is wound forward to the first spool 10. The photographic film is stuck to the light-shielding paper 20, and is wound forward to the first spool 10 with the light-shielding paper 20.

FIG. 7A shows the light shielding paper 20 and the light-shielding paper fastening seal 100, wherein the photographing of the whole cuts finished. When the photographing of the whole cuts finished, the light-shielding paper 20 is wound forward to the first spool 10, and it consequently appears that the light-shielding paper fastening seal 100 which has been adhered to the way of the border of the light-shielding paper 20 wound forward to the first spool 10 latest. The light-shielding paper fastening seal 100 is wound back on the second spool 12 in the direction of winding forward the second double-over part 132 to the first spool 10 for the first time, that is, toward the forward-winding direction of the first spool 10. Therefore, the light-shielding paper fastening seal 100 appears from the second double-over part 132.

The first roll 518 is constructed to protrude from the film guide part 516. When the second double-over part 132 of the light-shielding paper fastening seal 100 appears on the surface of the second spool 12, it get caught in the film guide 516 in a protrusion form. The second double-over part 132 is adhered to the light-shielding paper 20, but is in a free state, and is wound back on the second spool 12. Therefore, when the light-shielding paper fastening seal 100 is further wound back, the second double-over part 132 is maintained in the state of getting caught by the first roll 518.

FIG. 7B shows the light-shielding paper fastening seal 100 which is further transported to the side of the first spool 10, as compared with that of FIG. 7A wherein the second double-over part 132 gets caught in the first roll 518. If the light-shielding paper 20 is further transported to the first spool 10 with the second double-over part 132 getting caught, the first attaching part 102 of the light-shielding paper fastening seal 100 adhered to the light-shielding paper 20 moves to the way of the first spool 10 from the first roll 518 catching the second double-over part 132. At this time, the light-shielding paper fastening seal 100 between the second double-over part 132 and the first attaching part 102 passes through between the first roll 518 and the light-shielding paper 20, with being turn over.

As the above, when the light-shielding paper fastening seal 100 is wound forward from the second spool 12 to the first spool 10, the second double-over part 132 gets caught in the first roll 518. Therefore, while the second double-over part 132 gets caught in the first roll 518, the first attaching part 102 moves to the first spool 10 earlier than the second double-over part 132 does. That is, the double over of the first double-over part 130, which folds to turn the light-shielding paper fastening seal 100, gets unfolded with remaining the first attaching part 102. The light-shielding paper fastening seal 100 makes the side facing to the light-shielding paper 20 to look a surface.

As the above, in case that the first double-over part 130 passes through the first roll 518, the first double-over part 130 is folded to turn toward the forward-winding direction of the first spool 200 not toward the first attaching part 102. Therefore, when the light-shielding paper 20 is wound forward to the first spool 10, the first attaching part 102 of the light-shielding paper fastening seal 100 starts to be wound forward.

FIG. 7C shows the light-shielding paper fastening seal 100, wherein the second double-over part 132 comes off the first roll 518. The light-shielding paper fastening seal 100 is wound forward to the first spool 10 with the first attaching part 102 being the first. The light-shielding paper fastening seal 100 came off the first roll 518 is pressed into the front side of the camera by the cover guide 552 and the second roll 554. By the above, the light-shielding paper fastening seal 100 is spread out along the light-shielding paper 20. Therefore, the light-shielding paper fastening seal 100 is wound forward to the first spool 10 along the light-shielding paper 20 without being loose. And, since the first attaching part 102 adheres to the light-shielding paper 20, it is wound forward to the first spool 10 without getting caught. Therefore, the light-shielding paper fastening seal 100 can be kept from clotting in the inner side of the camera.

As the above, in case that the light-shielding paper fastening seal 100 passes through the first roll 518, the double over of the first double-over part 130 is stretched out. Therefore, the light-shielding paper fastening seal 100 is wound forward to the first spool 10 with the first attaching part 102 being the first. As the above, the first attaching part 102 is adhered in order to be wound forward to the first spool 10 the first. Therefore, when the light-shielding paper fastening seal 100 is wound forward to the first spool 10, the head section of forward winding can be kept from clotting or folding.

Further, as the above, since the description for users is set on the side that is placed in the surface of the first spool 10 at the time of being wound forward to the first spool 10, user can lift up the handle part 118 with reference to the description after extracting the first spool 10.

Figure 8A:
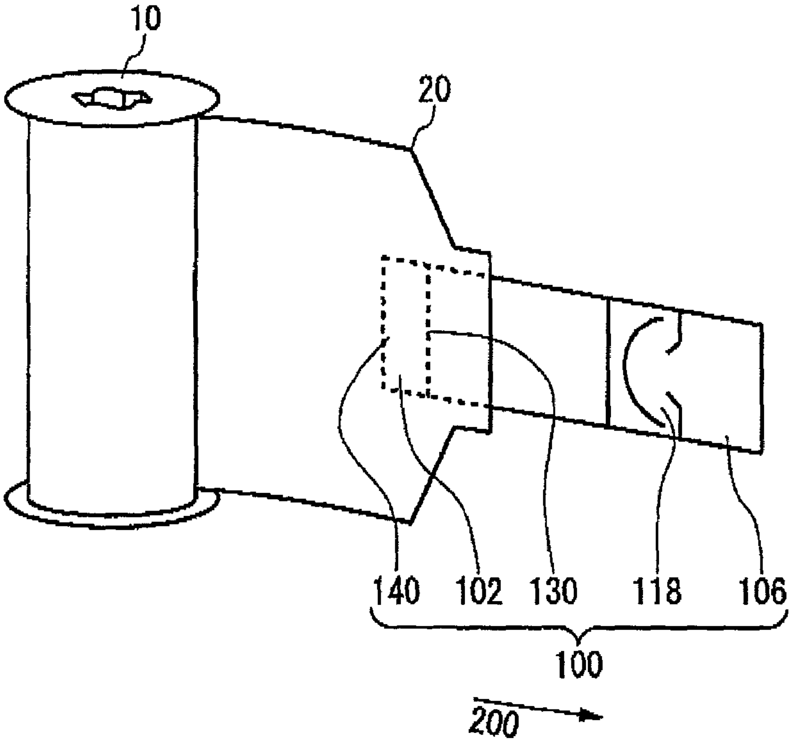
FIGS. 8A and 8B show the light-shielding paper wound forward to the first spool.
Figure 8B:
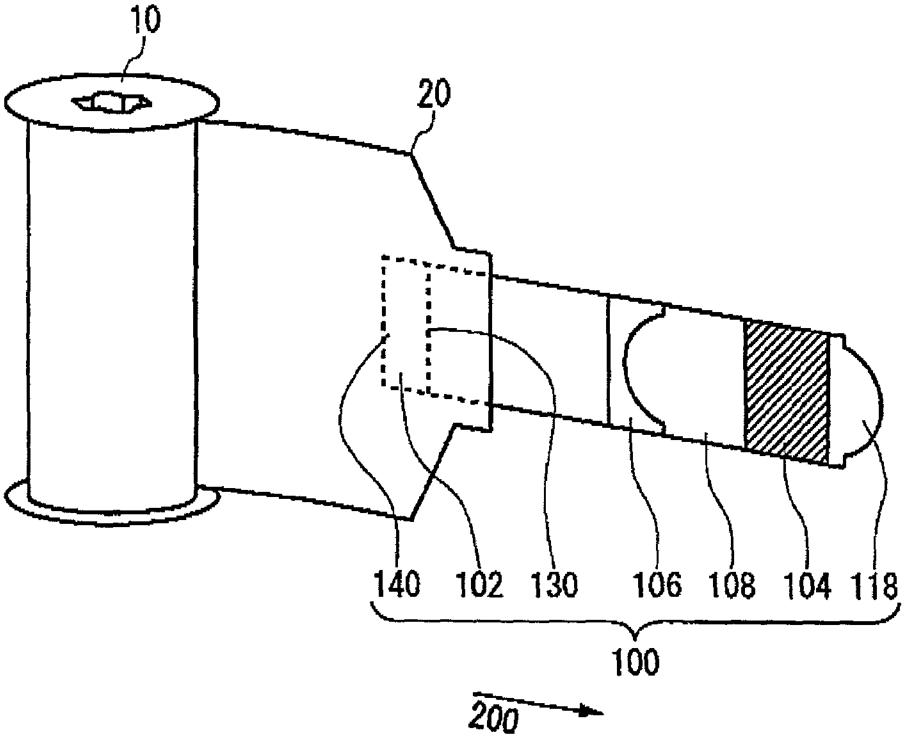

FIG. 8A and FIG. 8B show the light-shielding paper 20 wound back the first spool 10. FIG. 8A shows the light-shielding paper fastening seal 100, wherein the light-shielding paper 20 is wound forward. As the above, the first attaching part 102 adheres to the light-shielding paper 20 in order that the second attaching part 104 is placed in the outside of the wound end of the light-shielding paper 20.

FIG. 8B shows the light-shielding paper fastening seal 100, wherein user lifts up the handle part 118. The handle part 118 is lifted so as that the second attaching side 152 held between the second attaching part 104 and the masking part 108 is exposed. User winds the handle part 118 toward the rotating direction of the first spool 10, and then, fastens the second attaching side 152 to the body of the light-shielding paper 20.

As the above, since the handle part 118 is wound forward to the first spool 10 in the forward-winding direction of the light-shielding paper fastening seal 100, the light-shielding paper fastening seal 100 could be wound back on the first spool 10 without being loose. Therefore, the photographic film already used can be more surely shielded from the light.

Further, the handle part 118 and the first attaching part 102 are folded to separate side by the second double-over part 132. Therefore, even though user raises the handle part 118, the physical strength of lifting the first attaching part 102 from the light-shielding paper 20 doesn't work on the first attaching part 102. Therefore, the first attaching part 102 is kept from separating from the light-shielding paper 20.

Figure 9A:
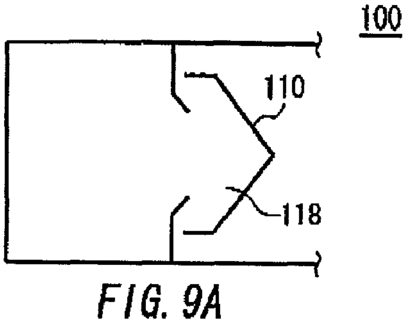
FIGS. 9A to 9E illustrate the modified examples of the handle part.

FIGS. 9A to 9E illustrate modified examples of the handle part 118. FIG. 9A shows the first modified example of the handle part 118. The handle part 118 of this example is a nearly triangle shape with the center of the first slit part 110 as the apex, and is respectively incised from 2 point except the apex in the triangle shape to the first terminus 112 and the second terminus 114 on straight lines nearly parallel to radius direction of the first spool 10. When the handle part 118 is lifted up, the apex rises up. Further, when the handle part 118 is lifted, the first slit part 110 is cleaved over so as to be the same body with 120.

Figure 9B:
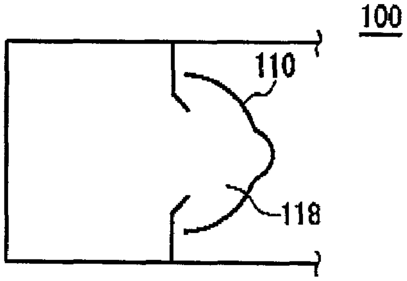

FIG. 9B shows the second modified example of the handle part 118. The first slit part 110 of this example is an arc shape, and has the protrusion on the nearly front end section of the first slit part 110 in an arc shape with smaller diameter than that of the arc shape of the first slit part 110. If the vicinity of the handle part 118 is curved, the handle part 118 of this example rises up from a point of this protrusion in an arc shape. It is same with the handle part 118 described in this embodiment in the above aspect.

Figure 9C:
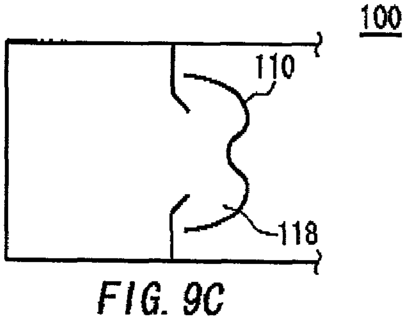

FIG. 9C shows the third modified example of the handle part 118. The first slit part 110 of this example has 2 apexes in a circular shape, and has a nearly circle projected to an opposite side between apexes. In case like this, when the handle part 118 is lifted up, any one of the two apexes in a circular shape rises up. As the above, the handle part 118 of this example also rises up from a point, similar to the handle part 118 of the embodiment. Therefore, the handle part 118 could rise up easily.

Figure 9D:
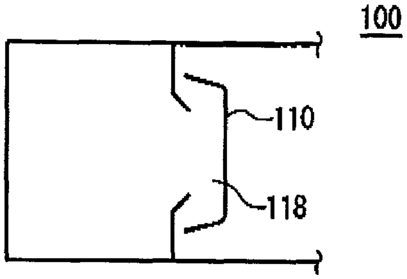

FIG. 9D shows the forth modified example of the handle part 118. The middle section of the first slit part 110 of this example is incised on a straight line nearly parallel to the axis direction of the first spool 10. When the vicinity of the handle part 118 is curved, the handle part 118 of this example rises up with said straight line as a start. The handle part 118 could also rise up safely in this case.

Figure 9E:
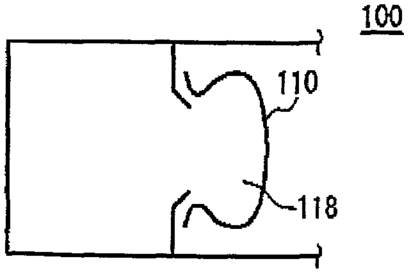

FIG. 9E shows the fifth modified example of the handle part 118. The front-end section of the first slit part 110 of this example is incised in a nearly arc shape, also, the incision line toward the first terminus 112 and the second terminus 114 is in a nearly arc shape. In this aspect, the handle part 118 of this example is similar to the handle part 118 described with the embodiment. The handle part 118 of this example has a hollow between the front-end section, and the first terminus 112 and the second terminus 114. But in this aspect, the handle part 118 of this example is not similar to the handle part 118 described with the embodiment. When the vicinity of the handle part 118 is curved, the handle part 118 of this example rises up with a point of the incision on the arc shape placed in the front section of the handle part 118 as a start. Also, the handle part 118 of this example could make the light-shielding paper fastening seal 100 delicately cleaved from the first slit part 110 to the second slit part 120.

Figure 10:
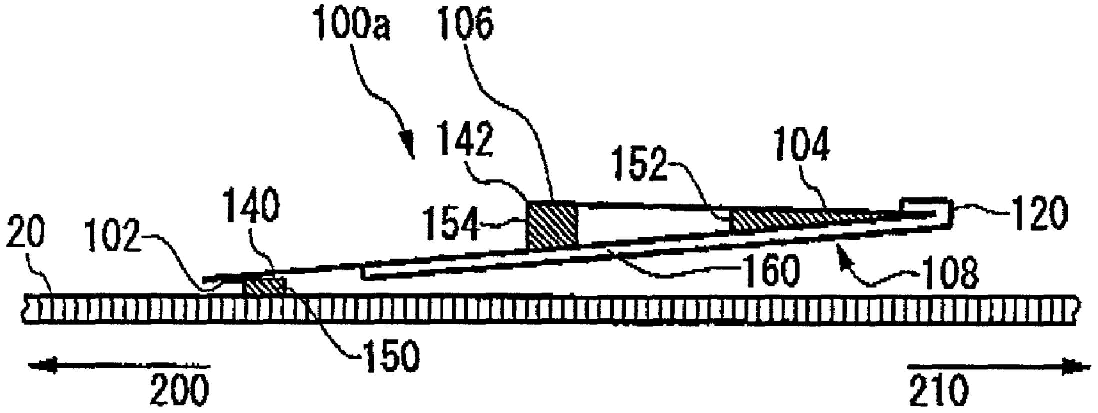
FIG. 10 illustrates the modified example of the light-shielding paper fastening seal.

FIG. 10 shows the modified example of the light-shielding paper fastening seal. The light-shielding paper fastening seal 100*a* of this example has the low frictional layer 160 where a lubricant is spread. The low frictional layer 160 is constructed in the part different from the first attaching part 102 and the second attaching part 104. Preferably, the low frictional layer 160 is constructed in the side different from the first attaching part 102 and the second attaching part 104. More preferably, the low frictional layer 160 is constructed while crossing the second double-over part 132.

The low frictional layer 160 is formed by spreading a lubricant on the light-shielding paper fastening seal 100. The lubricant is preferable to contain silicon, but may be wax. In case of containing silicon, it is not preferable that the remaining content of methylhydrogen polysiloxane with Si—H group, which is used as a cross-linking agent, is high, because of making an effect on the photosensitivity of film. In order that the remaining content of the cross-linking agent, that is, methylhydrogen polysiloxane gets decreased, it is preferable to contain silicon of de-alcohol type in case that the cross-linking reaction of silicon is a condensation type. And, in case that the cross-linking reaction is an addition type, it is preferable to contain silicon of the low-dissection or middle-dissection type which is not remained a cross-linking agent, rather than silicon of heavy-dissection type which is heighten the dissection strength through intentionally remaining a cross-linking agent.

The thickness of the lubricant layer of the low frictional layer 160 is, for example, 1 μm. That is, the thickness of the lubricant membrane is preferable to be from 0.1 μm and more to 5 μm and less, more preferable to be 0.3 μm and more to 3 μm and less. The spreading method of a lubricant is preferable to allow a lubricant to be spread thin, such as roller coating or gravure coating, but may be a deep coating or an extrusion coating.

Also, the base spreading for keeping a lubricant from permeating to the light-shielding paper fastening seal 100 can be allowed but not preferable.

Figure 11:
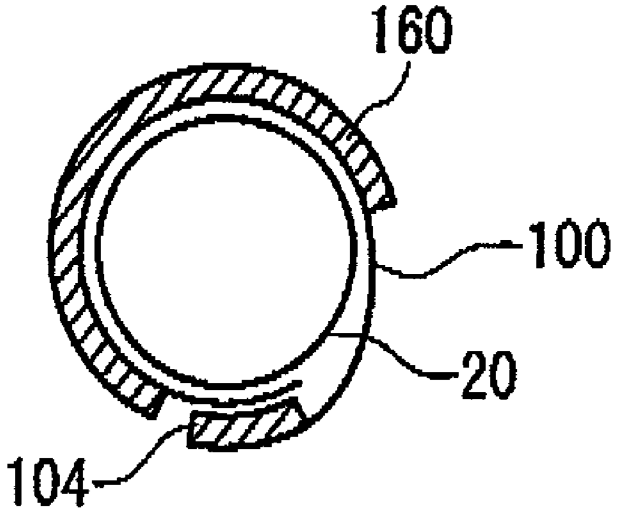
FIG. 11 shows the used example of the light-shielding paper fastening seal according to FIG. 10.

FIG. 11 is a sectional view showing the used example of the light-shielding paper fastening seal 100*a* of the FIG. 10. The second attaching part 104 of the light-shielding paper fastening seal 100*a* goes a round around the wound light-shielding paper 20, then adheres to the side of the light-shielding paper fastening seal 100*a* different from the second attaching part 104. As shown in this example, the low frictional layer 160 is preferable to be settled in order not to overlap with the position to which the second attaching part 104 adheres.

Since the low frictional layer 160 is constructed as the above, when the film and the light-shielding paper 20 are wound forward within the camera, the strength of the friction between the light-shielding paper fastening seal 100 and the inner part of the camera gets weaker.

Figure 12:
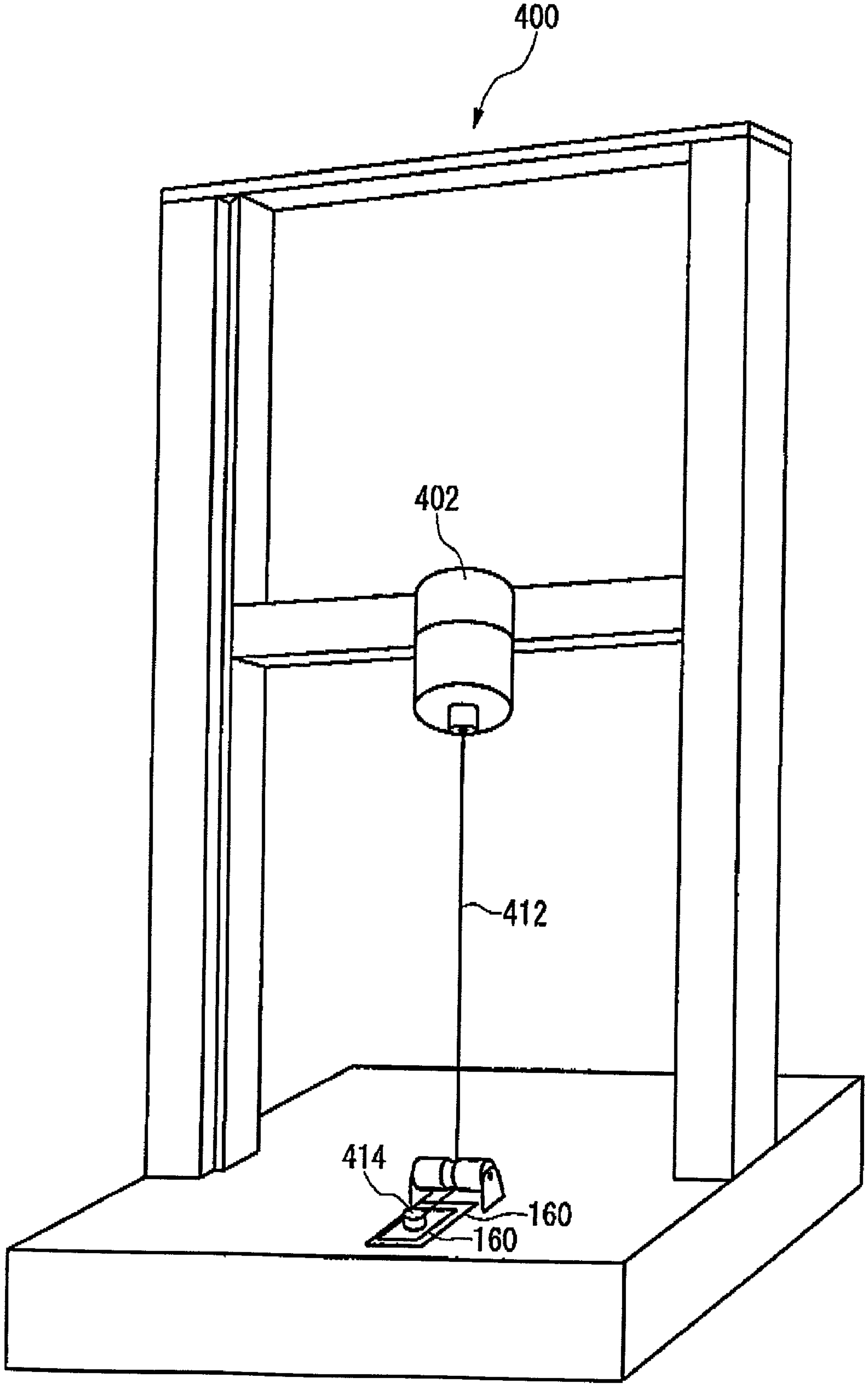
FIG. 12 illustrates an example of the measuring method for the friction coefficient of the low frictional layer.

FIG. 12 illustrates a method for measuring the friction coefficient of the low frictional layer 160. This measuring method is as follows. That is, the two sheets of the low frictional layer 160 are piled to face each other, and one of the weight 414 is put on them. Then, one end of the piano wire 412 is fixed to the road cell 402 of the tensiometer 400, and the other end is anchored to the upper the low frictional layer 160. Since the tensile direction of the road cell 402 is different from the moving direction of the low frictional layer 160, in order for the road cell 402 to be crooked, the spit part of the piano wire 412 is anchored to the road cell 402 and the low frictional layer 160 with the roller 404 mediating between the road cell 402 and the low frictional layer 160.

Therefore, the friction coefficient of the low frictional layer 160 is extracted by measuring the distortion degree and the weight applied to the road cell 402, followed by processing the results of measurement.

At this time, the area of the upper low frictional layer 160 is, for example, 12 mm×35 mm, and the area of the lower low frictional layer 160 is, for example, 20 mm×35 mm. And, the weight 414 is, for example, 8 mm×20 mm in the bottom side, and 41 gf in weight.

The static friction coefficient between the low frictional layer 160*s* is preferable to be 0.160 and less, for examples, if it is measured according to the method as illustrated in FIG. 12, for the low frictional layer 160 with 0.25 gf/mm$^2$ in load. And, the kinetic friction coefficient between the low frictional layer 160 is preferable to be 0.160 and less, for the low frictional layer 160 with 0.25 gf/mm$^2$ in load.

Figure 13:
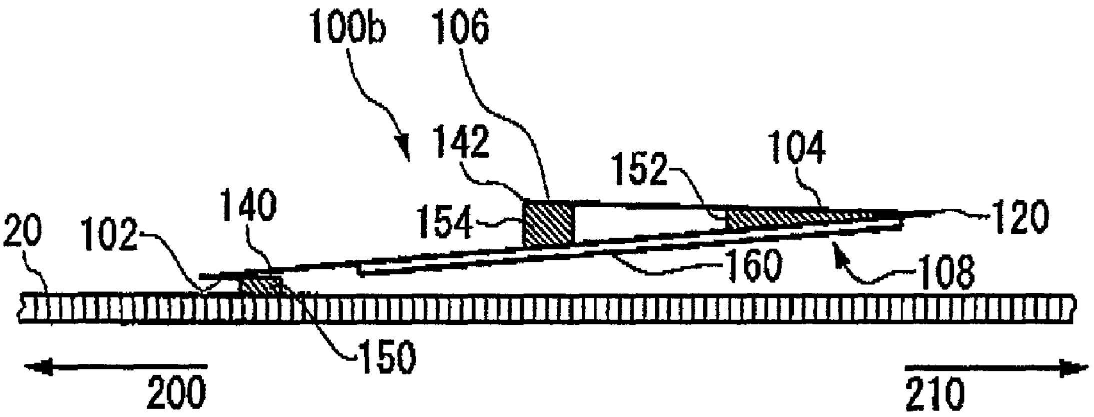
FIG. 13 illustrates the modified example of the light-shielding paper fastening seal according to FIG. 10.
Figure 14:
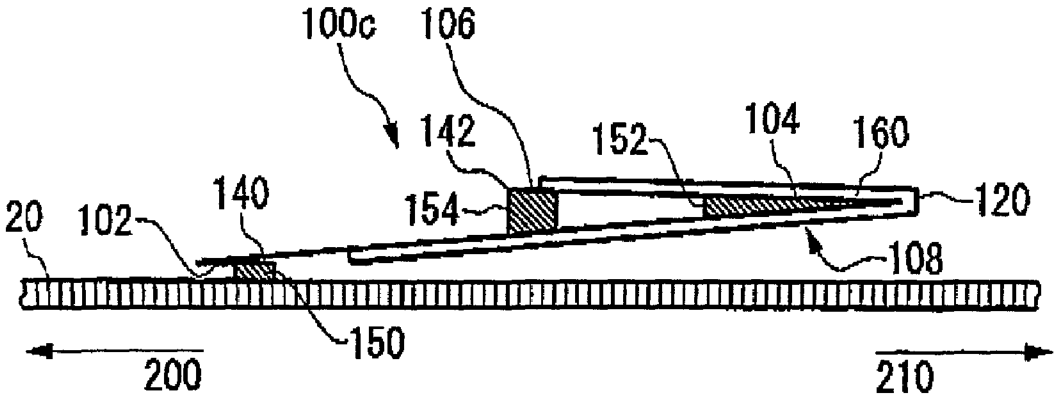
FIG. 14 illustrates the modified example of the light-shielding paper fastening seal according to FIG. 10.

Furthermore, as shown in FIG. 13, the low frictional layer 160 of the light-shielding paper fastening seal may be settled on the other side of the light-shielding paper fastening seal 100*b* in nearly whole. And, as like the light-shielding paper fastening seal 100*c* shown in FIG. 14, the low frictional layer 160 may be settled on from the first double-over part 130 to the second double-over part 132. Also, the low frictional layer 160 may be settled on the same side with the first attaching side 150.

Figure 15:
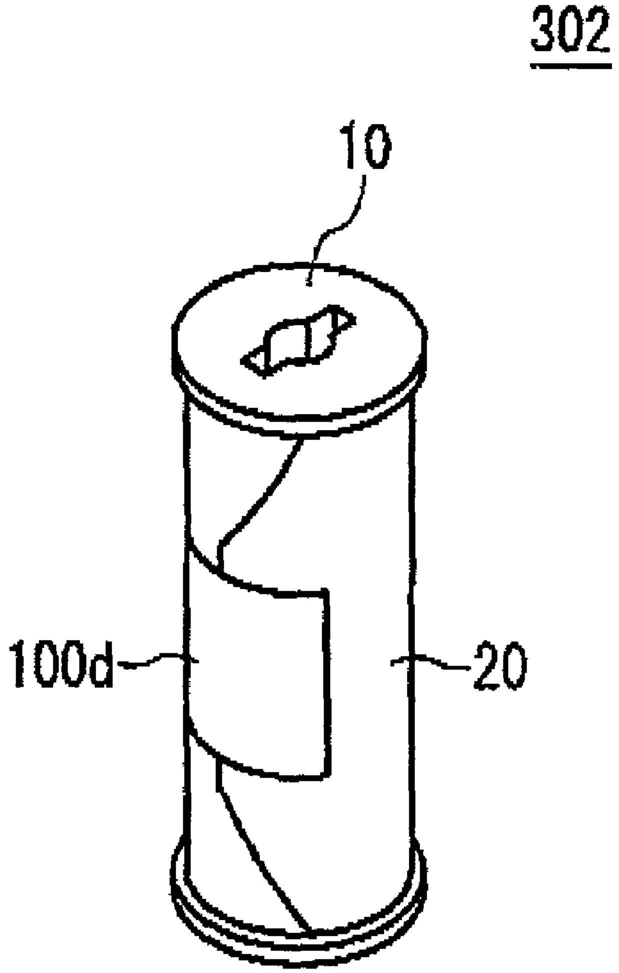
FIG. 15 is a perspective view showing the roll photo film.

FIG. 15 is a perspective view showing the whole roll photo film 302 according to the other example of the present embodiment. This roll photo film 302 has a photographic film, the light-shielding paper 20 shielding the photographic film from the light, the first spool 10 wound forward the photographic film and the light-shielding paper 20 to, and the light-shielding paper fastening seal 100*d* fastening the wound end of the light-shielding paper 20 to the body of the light-shielding paper 20.

This roll photo film 302 is different from the roll photo film 300 according to FIG. 1 with the aspect of the light-shielding paper fastening seal 100*d*. In the roll photo film 302, the same reference numerals will be gave to the same configuration to the roll photo film 300 with the description omitted.

The light-shielding paper fastening seal 100*d* provided to user, that is, the light-shielding paper fastening seal 100*d* wound back on the spool 10 will be described by the way of FIG. 16A to FIG. 18 as follows.

Figures 16A, 16B:
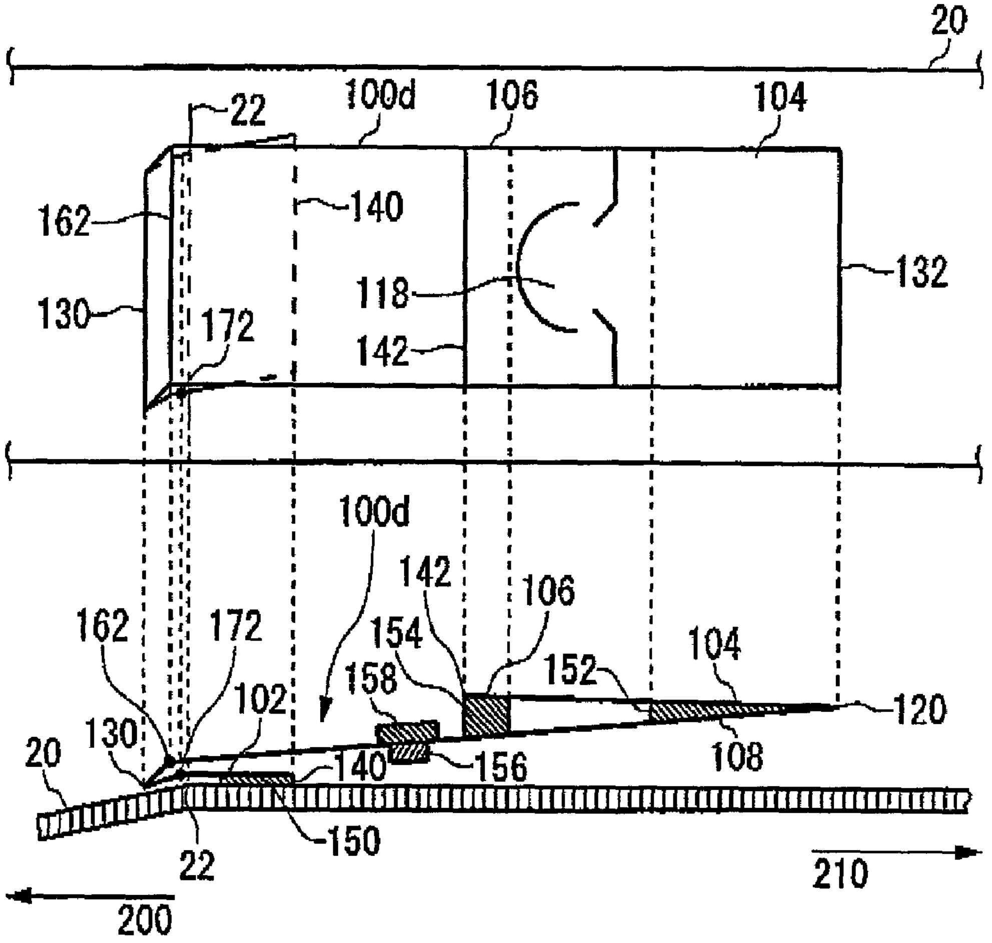
FIGS. 16A and 16B show the light-shielding paper fastening seal adhered to the light-shielding paper.

FIG. 16A shows the light-shielding paper fastening seal 100*d* adhered to the light-shielding paper 20. This figure is a top elevation view of the side looking outward, that is, the surface of the light-shielding paper fastening seal 100*d*, at the time that the light-shielding paper 20 winds back the light-shielding paper fastening seal 100*d* on the spool 10. FIG. 16B is a sectional view of the light-shielding paper fastening seal 100*d*.

This light-shielding paper fastening seal 100*d* is different from the light-shielding paper fastening seal 100 of FIG. 2 with the aspect of comprising the provisional fixing part 156, the separation part 158, the first folding trace part 162 and the second folding trace part 162. In the roll photo film 302, the same reference numerals will be gave to the same configuration to the roll photo film 300 with the description omitted.

The light-shielding paper fastening seal 100*d* has the provisional fixing part 156 on the opposite side to the first attaching part 102 and the second attaching part 104, and the separation part 158 on the same side with the first attaching part 102 and the second attaching part 104 but in the position of opposing to the provisional fixing part 156.

The provisional fixing part 156 has a cohesive layer or an adhesive layer, adheres to the light-shielding paper 20 before use. That is, the provisional fixing part 156 makes the pre-using the light-shielding paper fastening seal 100*d* to provisionally adhere, so as to keep the light-shielding paper fastening seal 100*d* from coming off the light-shielding paper 20. The adhesive agent capable of being used to the provisional fixing part 156 is, for example, EVA, polyamide-base hot melt adhesive agent.

Further, when the light-shielding paper fastening seal 100*d* is used, user separates the provisional fixing part 156 from the light-shielding paper 20. For the above, the adhesive strength of the cohesive layer or the adhesive layer contained to the provisional fixing part 156 to the light-shielding paper 20 is preferable to be stronger than the fracture strength of the corresponding cohesive layer or adhesive layer. In this case, when user separates the provisional fixing part 156 from the light-shielding paper 20, the cohesive layer or the adhesive layer is destructed. Further, the strength of the cohesive layer or the adhesive layer is preferable to be weaker than the strength of the light-shielding paper 20 or the light-shielding paper fastening seal 100*d*.

Also, the cohesive layer or the adhesive layer may be constructed that the surface of the light-shielding paper fastening seal 100*d* is damaged, or that the surface of the light-shielding paper 20 is damaged.

The separating treatment is applied on the separation part 158, such as construction of the layer that is not capable to attach with any of adhesives or cohesive agents as like silicon layer. Therefore, even though the light-shielding paper fastening seal 100*d* is piled in the manufacturing process, it is not happen to that the plurality of the light-shielding paper fastening seal 100*d* adhere to each other due to the provisional fixing part 156.

In this example, the first double-over part 130 and the second double-over part 132 are constructed on the place where the first border 140 and the second border 142 as the end of the light-shielding paper fastening seal 10*d* are not overlapped each other. The provisional fixing part 156 is constructed in the section of one sheet of the light-shielding paper fastening seal 100*d*, that is, the place where the both ends of the light-shielding paper fastening seal 100*d* are not overlapped each other. In this case, since the light-shielding paper fastening seal 100*d* is appropriately come off the light-shielding paper 20, user can easily separate the provisional fixing part 156 from the light-shielding paper 20.

The first folding trace part 162 is formed by folding to curve with projecting over the surface. And, the second folding trace part 172 is constructed on the place facing in the first folding trace part 162 of the light-shielding paper fastening seal 100*d*, the light-shielding paper folding trace part 22 is also placed on the site facing to the second folding trace part 172 in the light-shielding paper 20. The second folding trace part 172 and the light-shielding paper folding trace part 22 are folded to curve with protruding over the surface, similar to the first folding trace part 162. The first folding trace part 162, the second folding trace part 172 and the light-shielding paper folding trace part 22 will be described as follows by the way of FIG. 17 and FIG. 18.

Figure 17:
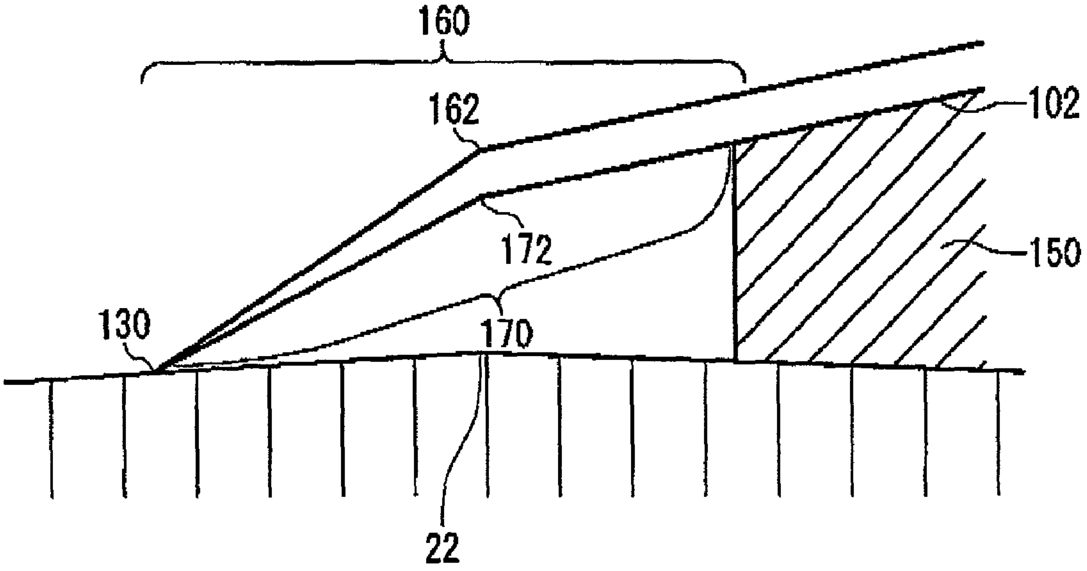
FIG. 17 shows the light-shielding paper fastening seal 100*d* wound forward to the first spool.

FIG. 17 is an enlarged view of the essential part of the light-shielding paper fastening seal 100*d*. When the light-shielding paper fastening seal 100*d* is wound back on the spool 10 winding the pre-use photographic film, the light-shielding paper fastening seal 100*d* is wound back with the side of the first double-over part 130 as a start. The first double-over part 130 according to this embodiment is adhered to the light-shielding paper 20 but is settled in a free state. The configuration of the vicinity of the first double-over part 130 will be described by the way of this figure.

The first free margin 160 is extended from the first double-over part 130, and is placed on the side of the surface of the light-shielding paper 20. The second free margin 170 is extended from the first double-over part 130, and is placed between the first free margin 160 and the light-shielding paper 20. The second free margin 170 doesn't have the first attaching layer 150. That is, the second free margin 170 is settled in the place of not overlapping with the first attaching part 102. As the above, the first free margin 160 and the second free margin 170 are not adhered to the light-shielding paper 20, as long as the light-shielding paper fastening seal 100*d* doesn't be used yet.

The first free margin 160 and the second free margin 170 has respectively the first folding trace part 162 and the second folding trace part 172. The first folding trace part 162 and the second folding trace part 172 is folded to curve with protruding to the surface. That is, the first folding trace part 162 and the second folding trace part 172 fold the light-shielding paper fastening seal 100*d* to curve, in order that the first double-over part 130 goes toward the light-shielding paper 20. Therefore, when the light-shielding paper 20 that is adhered the first attaching part 102 to, is wound back on the spool 10 in a roll form, the first free margin 160 extending from the first double-over part 130 to the first folding trace part 162 is placed in the site of facing to the first double-over part 130, with heading to the almost tangent line of the spool 10.

The second folding trace part 172 is constructed in the place closer to the first double-over part 130 than the first attaching part 102. That is, the second folding trace part 172 is settled not to overlap with the first attaching part 102. Therefore, when the light-shielding paper 20 adhered the first attaching part 102 to, is wound back on the spool 10 in a roll form, the second free margin 170 extending from the first double-over part 130 to the second folding trace part 172 can more certainly look to the light-shielding paper 20.

Also, the first folding trace part 162 and the second folding trace part 172 are constructed to face each other. Therefore, the light-shielding paper fastening seal 100*d* is wound back on the spool 10 with the first folding trace part 162 and the second folding trace part 172 contacting each other. Because of the above, a gap between the first folding trace part 162 and the second folding trace part 172 is hard to appear. As the above, that the first folding trace part 162 and the second folding trace part 172 are constructed to face each other, keeps the light-shielding paper 20 and the light-shielding paper fastening seal 100*d* from being loosely wound back on the spool 10.

Furthermore, the light-shielding paper 20 has the light-shielding paper folding trace part 22 on the corresponding site to the first folding trace part 162. The light-shielding paper folding trace part 22 is folded to curve with protruding to the surface, as like the first folding trace part 162 and the second folding trace part 172. As the above, the first folding trace part 162 and the second folding trace part 172 are not only folded to curve, but the light-shielding paper folding trace part 22 is also folded at the corresponding site to curve. Therefore, the first folding trace part 162 and the second folding trace part 172 can comfortably maintain the folded trace.

Figure 18:
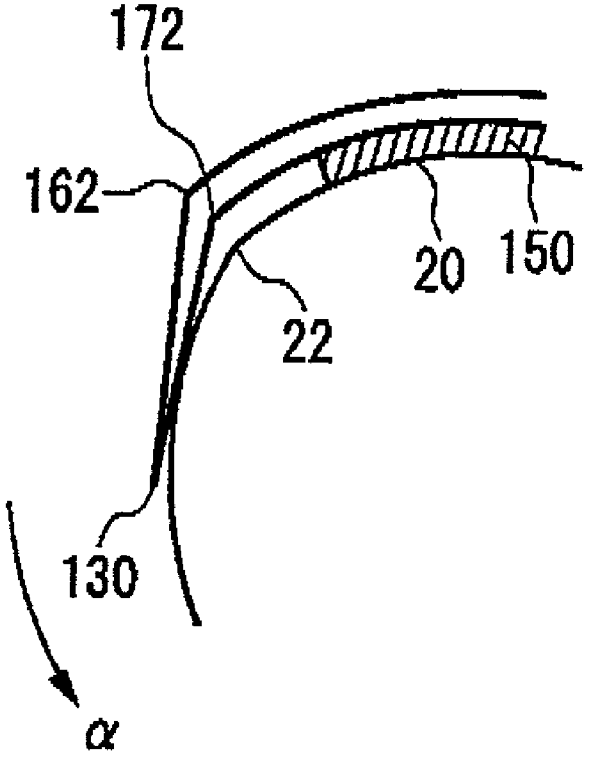
FIG. 18 shows the light-shielding paper that is wound back on the first spool for winding forward.

FIG. 18 shows the light-shielding paper fastening seal 100*d* wound back on the spool 10 that is provided to user, that is, winds the pre-use photographic film. This figure shows the vicinity of the first double-over part 130 from the spool 10. The first attaching part 102 adheres to the light-shielding paper 20. The first folding trace part 162 and the second folding trace part 172 are respectively placed toward the forward-winding direction of the spool 200 from 120, and is folded to curve with protruding to the surface.

The first double-over part 130 is fixed to the light-shielding paper 20, but is constructed in a free state. Further, the first double-over part 130 is folded to curve toward the forward-winding direction of the spool 200 due to the first folding trace part 162 and the second folding trace part 172. That is, the first free margin 160 extending from the first double-over part 130 to the first folding trace part 162 could go toward the tangent line of the circle of the spool 10 on the position meeting with the first double-over part 130, due to the first folding trace part 162 and the second folding trace part 172. Similarly, the second free margin 170 extending from the first double-over part 130 to the second folding trace part 172 can go toward the tangent line of the circle of the spool 10 on the position meeting with the first double-over part 130, due to the first folding trace part 162 and the second folding trace part 172.

As the above, since the first folding trace part 162 and the second folding trace part 172 are folded to curve, when the spool 10 winds the light-shielding paper fastening seal 100*d* back, the first double-over part 130 is kept from coming off the light-shielding paper 20.

As the above, since use may wind the light-shielding paper fastening seal 100*d* in the forward-winding direction of the spool 10, the light-shielding paper fastening seal 100 is kept from being loosely wound. Therefore, it is capable of more certainly shielding the photographic film already used from the light.

Figure 19:
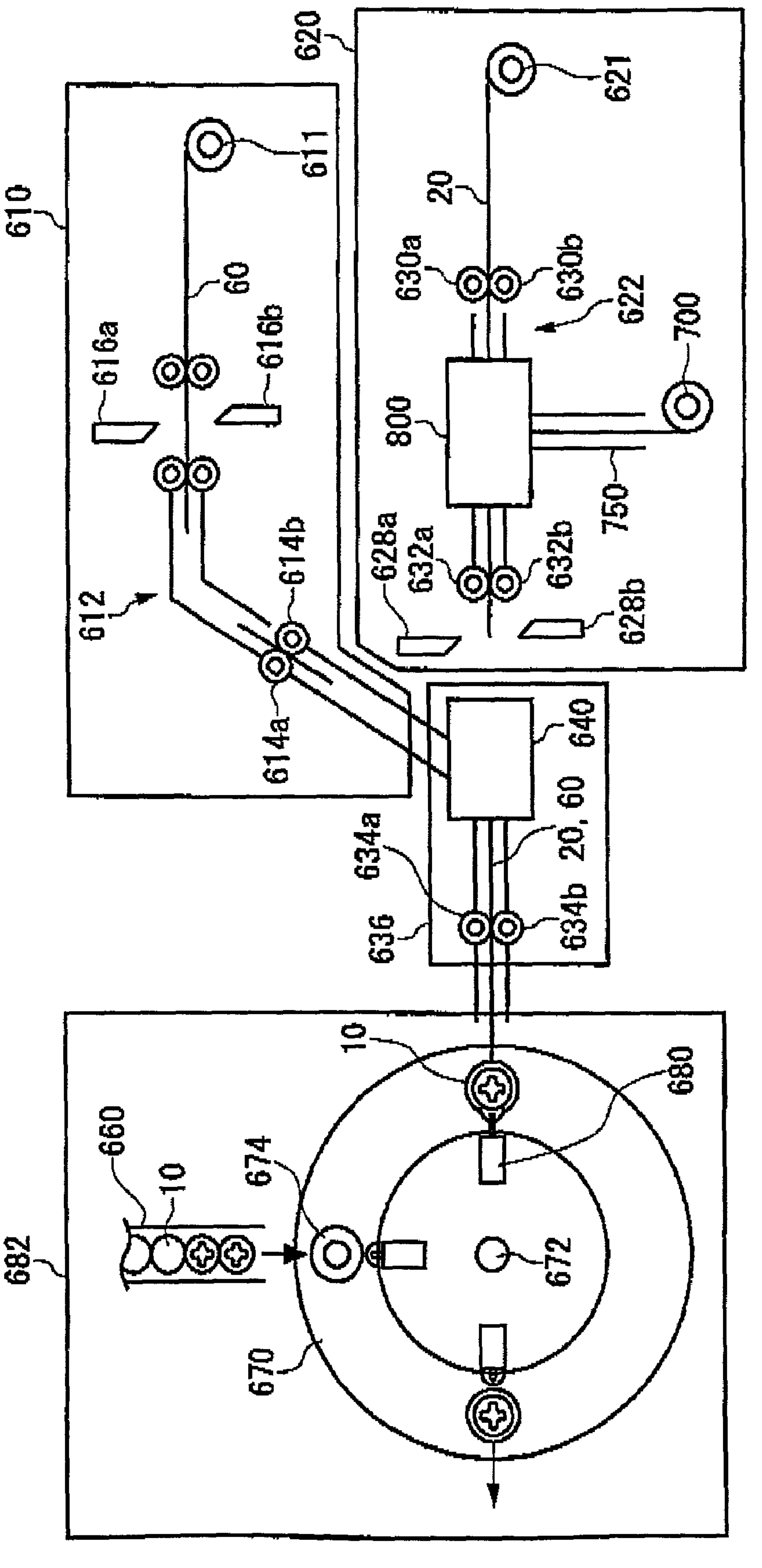
FIG. 19 shows the manufacturing apparatus of the roll photo film.

FIG. 19 shows the whole body of the manufacturing apparatus of the roll photo film 600. The manufacturing apparatus of the roll photo film 600 has the film supplying unit 610 supplying with the photographic film, the light-shielding paper supplying unit 620 supplying with the light-shielding paper 20, the attaching unit 636 adhering the photographic film to the light-shielding paper 20, and the winding unit 682 winding back the light-shielding paper 20 and the photographic film 60 on the spool 10.

The film supplying unit 610 has the film roll 611, the transporting road 612, the film cutter the film cutter 611*a*, 616*b*, and the transporting roller board 614*a*, 614*b*.

The film roll 611 winds back and holds the photographic film 60. The film roll 611 prints on the photographic film 60 all kinds of information, such as size, sensitivity, species of film, lot number. The film roll 611 carries out the photographic film 60 printed the information of the film with the appropriate length to the transporting road 612. The said appropriate length is as long to be wound back on one of the spool 10, and is predetermined.

The transporting road 612 conveys the photographic film 60 withdrawn from the film roll 611 toward the attaching unit 636. The film cutter 611*a*, 616*b* are settled on the transporting road 612. The film cutter 611*a*, 616*b* cut the photographic film 60 withdrawn from the film roll 611 to the length of being wound back on one of the spool 10.

The transporting roller board 614*a*, 614*b* is settled on the transporting road 612 downstream of the film cutter 611*a*, 616*b*. The transporting roller board 614*a*, 614*b* convey the photographic film 60 cut by the film cutter 611*a*, 616*b* toward the light-shielding paper attaching part the light-shielding paper attaching part 640.

The light-shielding paper supplying unit 620 has the light-shielding paper roll part 621, the transporting roller board 630*a*, 630*b*, the light-shielding paper transporting road 622, the seal roll part 700, the light-shielding paper fastening seal attaching unit 800, the transporting roller board 632*a*, 632*b*, and the light-shielding paper cutter 628*a*, 628*b*.

The light-shielding paper roll 621 winds back and holds the light-shielding paper 20. The light-shielding paper roll part 621 carries out the light-shielding paper 20 with the length of being wound back on one of the spool 10 to the light-shielding paper transporting road 622.

The light-shielding paper transporting road 622 conveys the light-shielding paper 20 withdrawn from the light-shielding paper roll part 621 toward the light-shielding paper fastening seal attaching unit 800.

The transporting roller board 630*a*, 630*b* are settled on the light-shielding paper transporting road 622, transport the light-shielding paper 20 withdrawn from the light-shielding paper supplying unit 620 to the light-shielding paper fastening seal attaching unit 800.

Meanwhile, the seal roll part 700 winds back and holds the light-shielding paper fastening seal 100*d*. The seal roll part 700 carries out the light-shielding paper fastening seal 100*d* with the length of being wound back on one of the spool 10 to the light-shielding paper fastening seal transporting road 750.

The light-shielding paper fastening seal transporting road 750 cuts the light-shielding paper fastening seal 100*d* withdrawn from the seal roll part 700 to the length of being wound back on one of the spool 10. The light-shielding paper fastening seal transporting road 750 does trimming and makes the interlock hole for interlocking to the spool 10, on the front end and the rear end of the light-shielding paper fastening seal 100*d* cut. The light-shielding paper fastening seal transporting road 750 conveys the light-shielding paper fastening seal 100*d* applied the cutting, trimming etc., to the light-shielding paper fastening seal attaching unit 800.

The light-shielding paper fastening seal attaching unit 800 adheres the light-shielding paper fastening seal 100*d* to the light-shielding paper 20, wherein the light-shielding paper fastening seal 100*d* has been conveyed from the light-shielding paper fastening seal transporting road 750 and the light-shielding paper 20 has been conveyed from the light-shielding paper transporting road 622. The light-shielding paper fastening seal attaching unit 800 makes the first folding trace part 162 and the second folding trace part 172 on the light-shielding paper fastening seal 100*d*, and the light-shielding paper folding trace part 22 on the light-shielding paper 20. The light-shielding paper fastening seal attaching unit 800 transports the light-shielding paper 20 toward the light-shielding paper attaching part 640, wherein the light-shielding paper fastening seal 100*d* is adhered to and the folded trace is settled on said the light-shielding.

The transporting roller board 632*a*, 632*b* convey the light-shielding paper 20 withdrawn from the light-shielding paper fastening seal attaching unit 800 to the light-shielding paper cutter 628*a*, 628*b*. The light-shielding paper cutter 628*a*, 628*b* cut the light-shielding paper 20 with the length of being wound back on one of the spool 10.

The light-shielding paper attaching unit 636 has the light-shielding paper attaching part 640 and the tension roller board 634*a*, 634*b*.

The light-shielding paper attaching part 640 adheres the light-shielding paper 20 to the photographic film 60, wherein the light-shielding paper 20 has been conveyed from the light-shielding paper transporting road 622 and the photographic film 60 has been conveyed from the transporting road 612.

The tension roller board 634*a*, 634*b* is configured to compress the light-shielding paper 20 and the photographic film 60 with putting the light-shielding paper 20 and the photographic film 60 between them so as to rotate, corresponding to the light-shielding paper 20 and the photographic film 60 moving toward the spool tartlet 670. The rotating load of this the tension roller board 634*a* can be changeable, so as that the appropriate load may be added to the light-shielding paper 20 and the photographic film 60.

The winding unit 682 has the spool supplying part 660 and the spool tartlet 670. The spool tartlet 670 has a plurality of the spool holder 674 and the touch roller 680.

The spool supplying part 660 supplies the spool 10 to the spool tartlet 670. The spool tartlet 670 is a circular plate shape, and is constructed to be able to rotate around the rotating axis 672. The spool holder 674 holds the spool 10 supplied from the spool supplying part 660. The spool tartlet 670 rotates around the rotating axis 672. The spool holder 674 moves to the side of the tension roller board 634*a*, 634*b* by the revolution of the spool tartlet 670, with holding the spool 10 supplied from the spool supplying part 660. The spool holder 674 halts on the place of facing to the tension roller board 634*a*, 634*b*. On that place, the spool 10 winds back the photographic film 60 and the light-shielding paper 20. While the spool 10 set on the spool holder 674 winds back the photographic film 60 and the light-shielding paper 20, the touch roller 680 presses the light-shielding paper 20 and the photographic film 60 toward the spool 10. By the above, the spool 10 can wind back the light-shielding paper 20 and the photographic film 60 without being loose. The spool 10 wound back the light-shielding paper 20 and the photographic film 60 is pushed off from the spool tartlet 670.

Figures 20A, 20B:
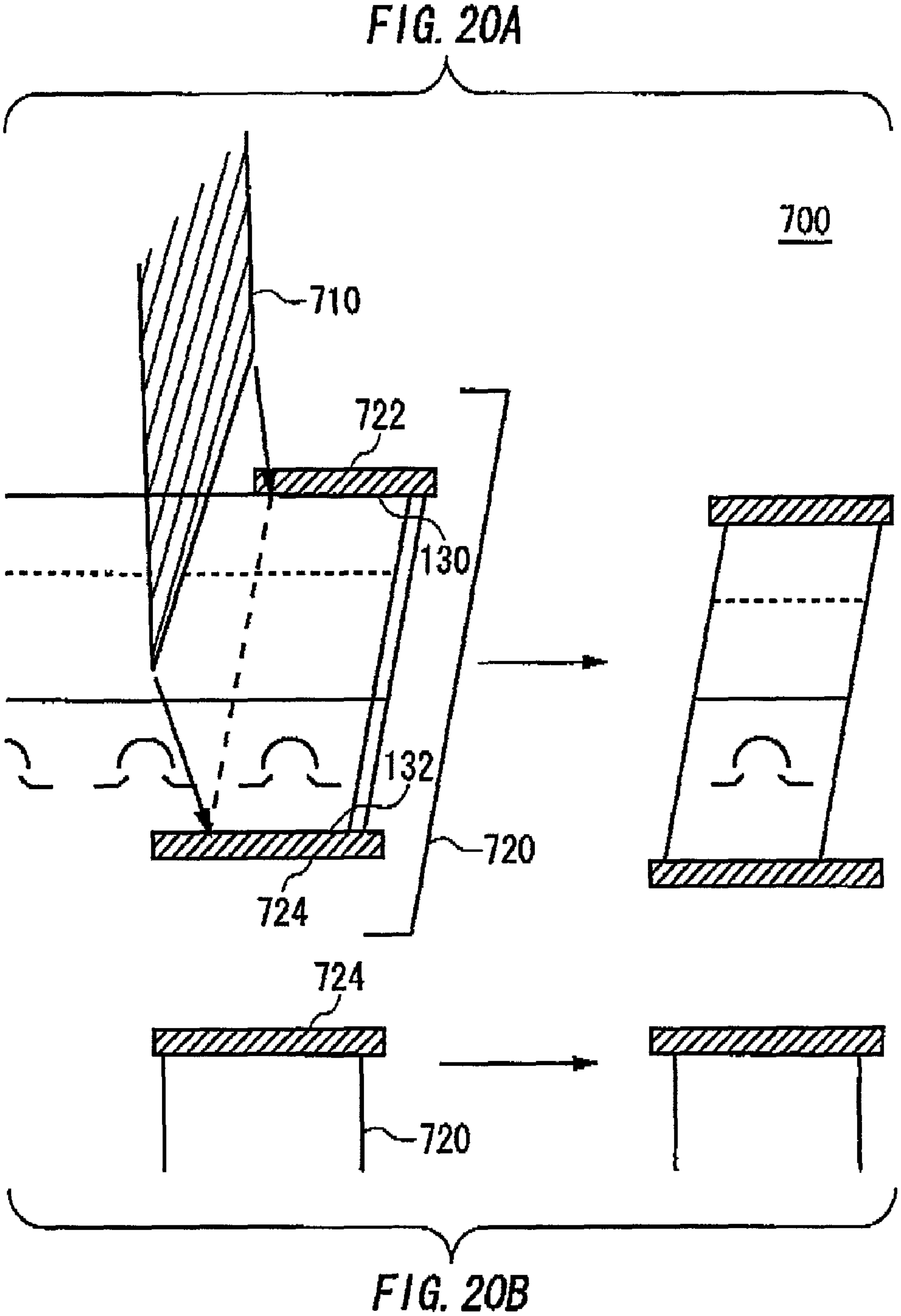
FIGS. 20A and 20B illustrate the operation of the seal transporting board.

FIG. 20A is a perspective view showing the light-shielding paper fastening seal transporting road 750. FIG. 20B is a side elevation viewing the seal transporting board 720 of FIG. 20A from the horizontal direction perpendicular to the transporting direction. The light-shielding paper fastening seal transporting road 750 has the seal cutter 710 and the seal transporting board 720. The seal transporting board 720 has the position determining guide 722, 724.

The light-shielding paper fastening seal 100 is wound on the seal roll part 700 with the first double-over part 130 and the second double-over part 132 looking perpendicularly to the axis of seal roll. The light-shielding paper fastening seal 100*d* wound on the seal roll part 700 is withdrawn horizontally to the edge of the first double-over part 130, and is conveyed to the seal transporting board 720. The position determining guide 722, 724 fix the first double-over part 130 and the second double-over part 132 of the light-shielding paper fastening seal 100 loaded on the seal transporting board 720.

The seal cutter 710 cuts the light-shielding paper fastening seal 100*d* loaded on the seal transporting board 720 in the length of being wound back on one spool. That is, the seal cutter 710 cuts perpendicularly to the first double-over part 130 so as for the first double over part 130 of the light-shielding paper fastening seal 100*d* to have an appropriate width. The seal transporting board 720 conveys the light-shielding paper fastening seal 100*d* cut to the light-shielding paper attaching part 640. At this time, the seal transporting board 720 conveys the light-shielding paper fastening seal 100*d* toward the perpendicular to the forward-winding direction of the spool 200. And, the position determining guide 722, 724 respectively hold the first double over part 130 and the second double-over part 132 not to be dislocated.

As the above, when the seal transporting board 720 move, the position determining guide 722, 724 convey the light-shielding paper fastening seal 100*d* cut with holding the first double-over part 130 and the second double-over part 132 not to be dislocated. Therefore, the light-shielding paper fastening seal 100*d* can be kept from dislocating toward the perpendicular direction to the first double-over part 130.

Figure 21:
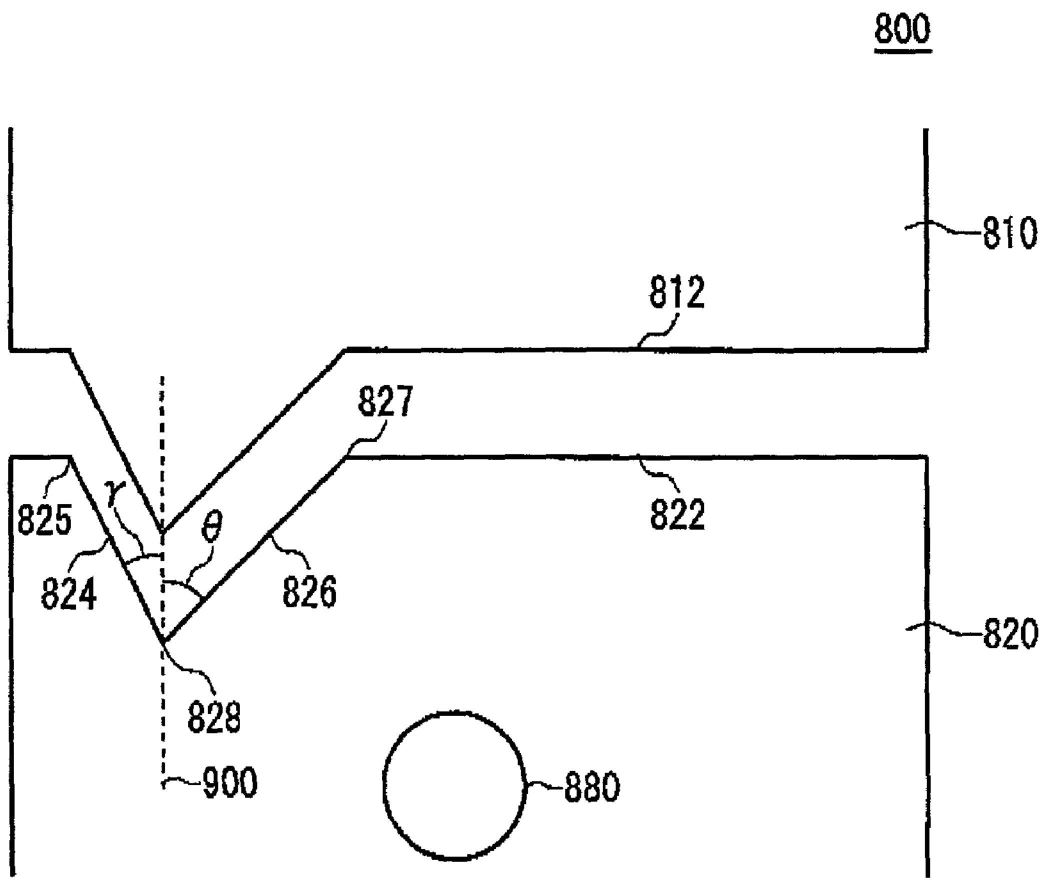
FIG. 21 shows the configuration of the light-shielding paper attaching part.

FIG. 21 is an enlarged view showing the essential part of the first block 810 and the second block 820 of the light-shielding paper fastening seal attaching part 800. The light-shielding paper fastening seal attaching part 800 has the first block 810 and the second block 820.

The first block 810 and the second block 820 respectively the first contacting side 812 and the second contacting side 822. The first contacting side 812 and the second contacting side 822 are constructed respectively in the corresponding shape. The first block 810 and the second block 820 put the light-shielding paper 20 and the light-shielding paper fastening seal 100*d* between the first contacting side 812 and the second contacting side 822, and press the light-shielding paper 20 and the light-shielding paper fastening seal 100*d* to mold the light-shielding paper 20 and the light-shielding paper fastening seal 100*d*.

As the above, since the first contacting side 812 and the second contacting side 822 are constructed in the engaging shape, the first contacting side 812 and the second contacting side 822 can efficiently press the light-shielding paper 20 and the light-shielding paper fastening seal 100*d*.

From now, the shape of the second contacting side 822 will be described. The second contacting side 822 has the hollow extending from the first hollow border 825 to the second hollow border 827, and is sunken toward the inner side of the second block 820 in V letter shape. The sectional plan of the hollow has the first edge 824 extending from the V letter shape apex 828 to the first hollow border 825, and the second edge 826 extending from the V letter shape apex 828 to the second hollow board 827 with the V letter shape apex 828 as an apex. The second edge 826 is constructed to be longer than the first edge 824. That is, the angle formed by the second contacting side 822 and the second hollow border 827 is constructed to be smaller than that of the V letter shape apex 828. Therefore, it is preferable for the V letter shape apex 828 to be an acute angle, and for the second hollow border 827 to be an obtuse angle.

As the above, since the V letter shape apex 828 is constructed to be an acute angle and the second hollow board 827 is constructed to be an obtuse angle, the light-shielding paper fastening seal 100*d* and the light-shielding paper 20 facing the V letter shape apex 828 can be folded to curve to be more acute.

Also, at this time, the degree of the angle $\gamma$ made by the vertical line 900 perpendicular to the flat part of the second contacting side 822 and the first edge 824 is smaller than that of the angle $\theta$ made by the vertical line 900 and the second edge 826.

Further, since the first contacting side 812 is constructed in the shape corresponding to the second contacting side 822, the description for the configuration of the first contacting side 812 is omitted.

The heater 880 is buried in the second block 820, and heats the second block 820.

Figure 22:
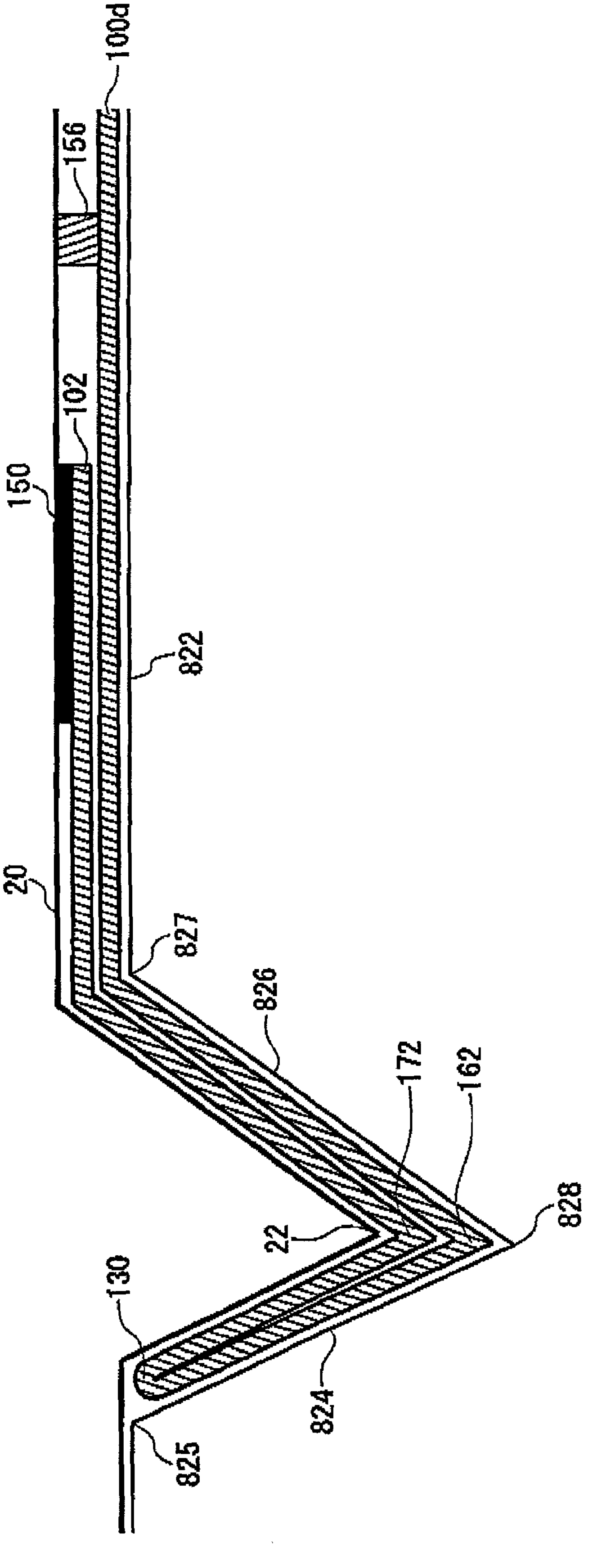
FIG. 22 shows the light-shielding paper attaching part with pressing the light-shielding paper fastening seal and the light-shielding paper.

FIG. 22 shows the light-shielding paper fastening seal 100*d* and the light-shielding paper 20 that have been inserted between the first block 810 and the second block 820 and pressed.

The light-shielding paper fastening seal 100*d* is conveyed to the second block 820 with being loaded on the seal transporting board 720 described in FIG. 19. The light-shielding paper fastening seal 100*d* is placed on the second contacting side 822 for the first double-over part 130 to contact to the first edge 824, when the light-shielding paper fastening seal 100*d* is inserted between the first block 810 and the second block 820 and being pressed. As the above, since the first double-over part 130 is constructed to be received in the hollow with the V letter shape when being inserted between the first block 810 and the second block 820, the first double-over part 130 is kept from contacting with the first hollow border 825 and being folded to curve inappropriately.

The seal transporting board 720 conveys the light-shielding paper fastening seal 100*d* with the position determining guide 722, 724 guiding the first double-over part 130 and the second double-over part 132 of the light-shielding paper fastening seal 100*d*. Therefore, the second block 820 can place the light-shielding paper fastening seal 100*d* conveyed by the seal transporting board 720 on the pre-determined position without dislocated.

The light-shielding paper 20 is conveyed from the light-shielding paper transporting road 322 to the second block 820. The light-shielding paper 20 is placed in the pre-determined position on the second block 820. The light-shielding paper 20 is placed in order that the position of the light-shielding paper 20 to that the light-shielding paper fastening seal 100*d* should be adhered, meets with the second attaching part 104 of the light-shielding paper fastening seal 100*d*.

Further, the light-shielding paper fastening seal 100*d* and the light-shielding paper 20 are constructed for the side looking to the surface to face to the second contacting side, when being respectively wound back on the spool 10.

The light-shielding paper fastening seal 100*d* and the light-shielding paper 20 are placed on the appropriate site, then the first block 810 and the second block 820 put the light-shielding paper fastening seal 100*d* and the light-shielding paper 20 between them. The light-shielding paper fastening seal 100*d* is pressed by the first block 810 and the second block 820. Through the above, the first folding trace part 162 and the second folding trace part 172 is molded on the light-shielding paper fastening seal 100*d* corresponding to the hollow of the second contacting side 822 in the V letter shape. Similarly, the light-shielding paper folding trace part 22 is molded on the light-shielding paper 20.

The first block 810 and the second block 820 can mold the light-shielding paper fastening seal 100*d* so as that the first double-over part 130 is placed on the position of facing to the end of the corresponding free border and looks to the nearly direction of the tangent line of the spool 10 when the light-shielding paper fastening seal 100*d* is wound back on the spool 10.

Also, at this time, since the heater 880 heats the second block 820, the first folding trace part 162, the second folding trace part 162 and the light-shielding paper folding trace part 22 is more certainly formed by heat.

The heater 880 heats the first attaching layer 150 and the provisional fixing part 156 having the hot melt adhesives. By the above, the first attaching layer 150 can be adhered to the light-shielding paper 20. And the provisional fixing part 156 is provisionally adhered to the light-shielding paper 20. By the above, when the first folding trace part 162, the second folding trace part 162 and the light-shielding paper folding trace part 22 id formed, it can be simultaneously happen that the first attaching layer 150 is adhered to the light-shielding paper 20 and the provisional fixing part 156 is provisionally adhered to the light-shielding paper 20. That is, the roll photo film 302 can be efficiently produced.

The hot melt adhesive layer of the provisional fixing part 156 is preferable to be formed to have the thickness thicker than that of the first attaching part 102 and the first attaching layer 150. In this case, the provisional fixing part 156 is provisionally adhered to the light-shielding paper 20 more certainly.

Also, the first block 810 and the second block 820 simultaneously mold the light-shielding paper fastening seal 100*d* and the light-shielding paper 20 with the light-shielding paper fastening seal 100*d* being placed on the light-shielding paper 20. By the above, the first folding trace part 162, the second folding trace part 162 and the light-shielding paper folding trace part 22 are simultaneously molded to the same shape. Therefore, the spool 10 can wind back the light-shielding paper 20 and the light-shielding paper fastening seal 100*d* with the first folding trace part 162, the second folding trace part 162 and the light-shielding paper folding trace part 22 being overlapped. That is, the gap between the light-shielding paper fastening seal 100*d* and the light-shielding paper 20, and between the light-shielding paper fastening seal 100*d* facing each other can be smaller as possible. Therefore, the light-shielding paper 20 is kept from loosely wound back on the spool 10.

Figure 23:
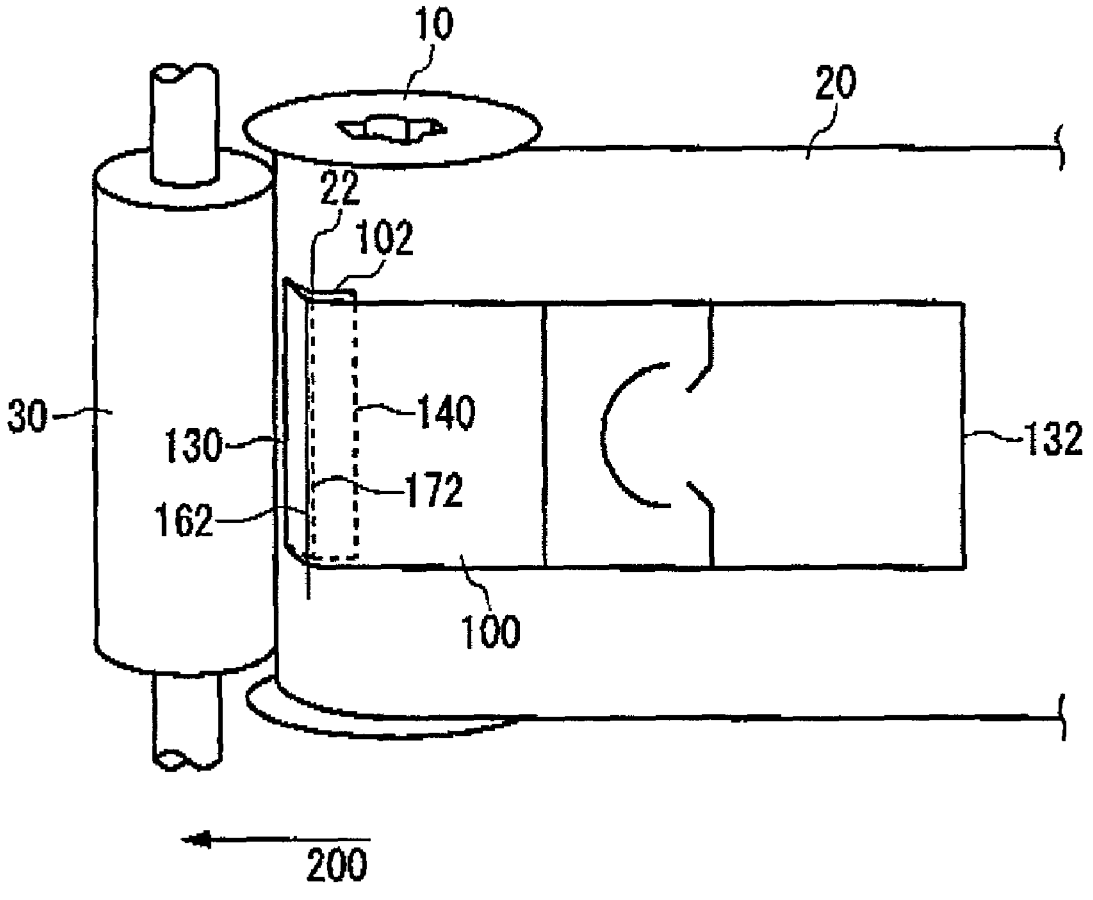
FIG. 23 shows the step of winding back the light-shielding paper on the first spool.

FIG. 23 illustrates the spool 10 set on the spool holder 674 and the touch roller 680. The spool 10 winds back the light-shielding paper 20 rotating around the axis. At this time, the touch roller 680 contacts with the light-shielding paper 20 wound back on the spool 10, and presses the light-shielding paper 20 against the axis direction of the spool. As like this, when the photographic film 30 and the light-shielding paper 20 are wound back on the spool 10, since the touch roller 680 presses the photographic film 30 and light-shielding paper 20 into the spool 10, the spool 10 can wind back the photographic film 30 and light-shielding paper 20 without being loose.

Meanwhile, the light-shielding paper fastening seal 100*d* is wound back on the spool 10, with the first double-over part 130 adhered to the light-shielding paper fastening seal 100*d* but in a free state going off the light-shielding paper 20. As being described by the way of FIG. 17 and FIG. 18, the light-shielding paper fastening seal 100*d* according to this embodiment, that is, the first folding trace part 162 and the second folding trace part 172 are folded to curve toward the surface of the spool 10. As the above, the first double-over part 130 looks to the forward-winding direction of the spool 200. Therefore, when the first double-over part 130 contacts to the touch roller 680, the first double-over part 130 is pressed against the touch roller 680 without being risen to turn and can be wound without being loose.

In case of that the first double-over part 130 is risen to turn by the touch roll 680, the touch roll 680 presses the first double-over part 130 having been risen to turn. Therefore, the spool 10 happens to wind back the first double-over part 130 of the inappropriate configuration. Therefore, the gap happens to appear in the vicinity of the first double-over part 130. Since the light-shielding paper fastening seal 100*d* according to this embodiment has the first folding trace part 162 and the second folding trace part 172, the first double-over part 130 can be kept from being risen to turn.

Further, the seal transporting board 720 according to this embodiment has two of the position determining guide 722, 724 respectively fixing the first double-over part 130 and the second double-over part 132, but may have one of the position determining guide in the first modified embodiment. In this case, the position determining guide 722 contacts to the first double-over part 130, and could keep the light-shielding paper fastening seal 100*d* from moving to the direction perpendicular to the edge of the first double-over part 130.

Figure 24:
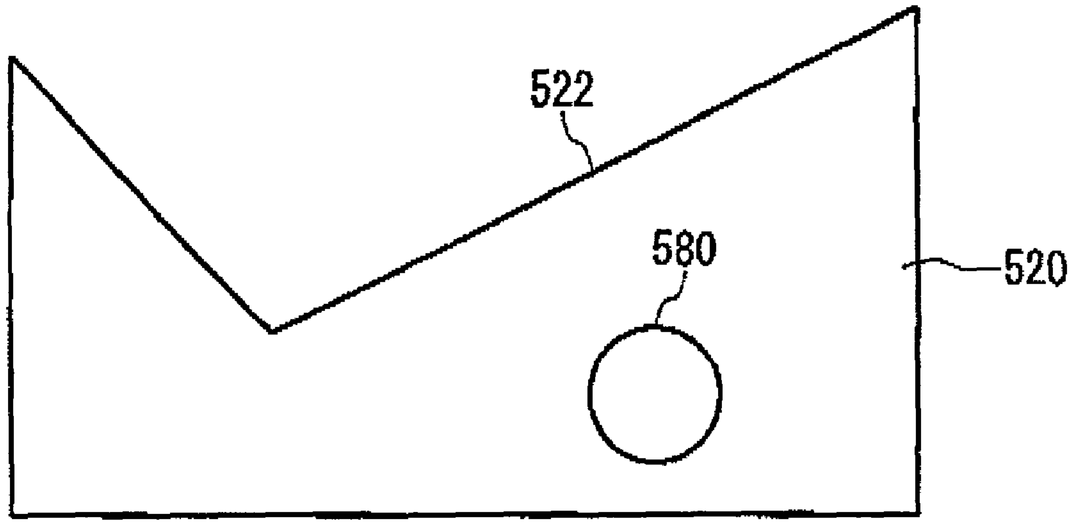
FIG. 24 illustrates the modified example of the second block.

In the second modified embodiment, the configuration of the second block 820 may be modified. FIG. 24 shows the modified embodiment of the second block 820. The first block 810 and the second block 820 according to this embodiment have the hollow in the V letter shape, but that may be substituted of that the first contacting side 812 has the sectional side, which is extending from the disposition where the first double-over part 130 is settled to the disposition where the second double-over part 132 is settled, and is caved gently in the L letter shape. At this time, the first contacting side 812 of the first block 310 is constructed in the shape corresponding to the second contacting side 822. In that case, the first folding trace part 162, the second folding trace part 162 and the light-shielding paper folding trace part 22 can be also folded to curve in certain.

Figure 25:
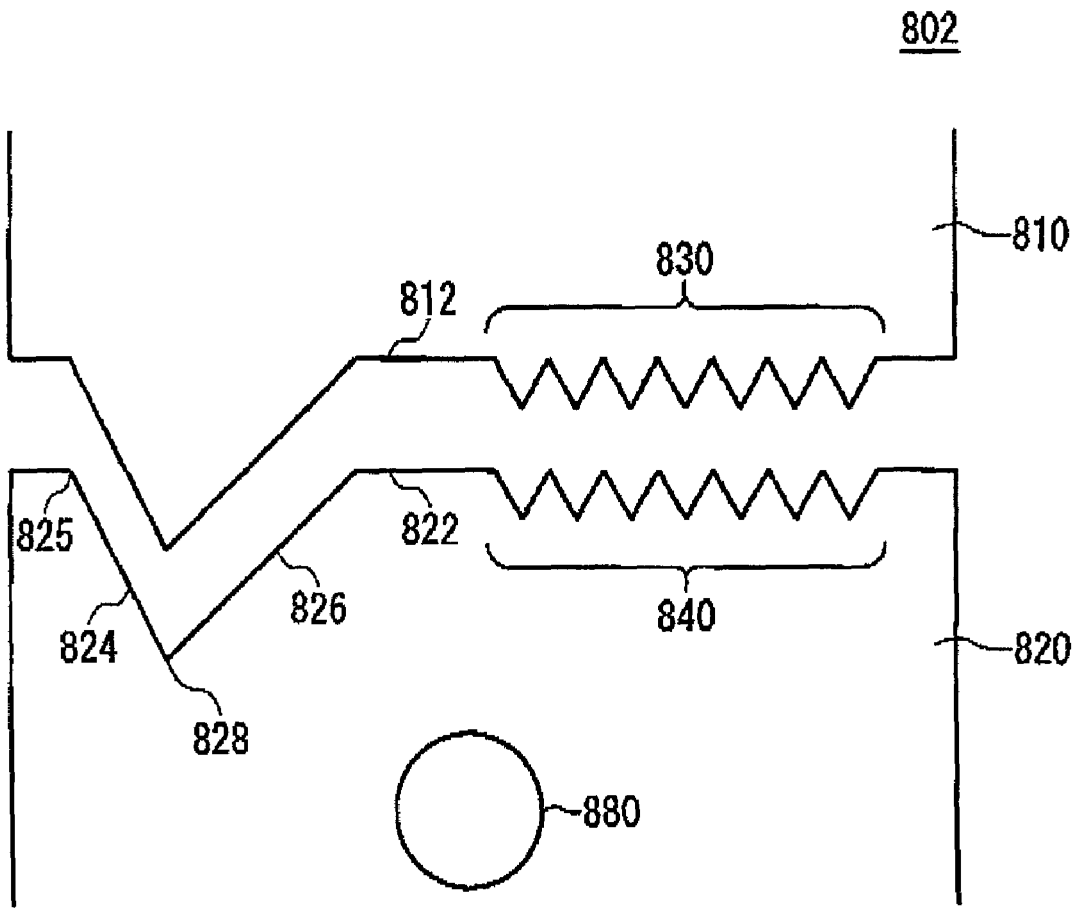
FIG. 25 illustrates the first modified example of the first block and the second block.

In the third modified embodiment, as illustrated in a schematic side view of FIG. 25, the convexo-concave part 830 and the convexo-concave part 840 may be constructed respectively on the first contacting side 812 of the first block 810 and the second contacting side 822 of the second block 820.

The convexo-concave part 830, for example, is consisted of a saw tooth as the sectional side, has the plurality of convexo part in sequence.

The convexo-concave part 840 has the shape corresponding to the convexo-concave part 830, for example, has the plurality of concave part in sequence.

Figure 26:
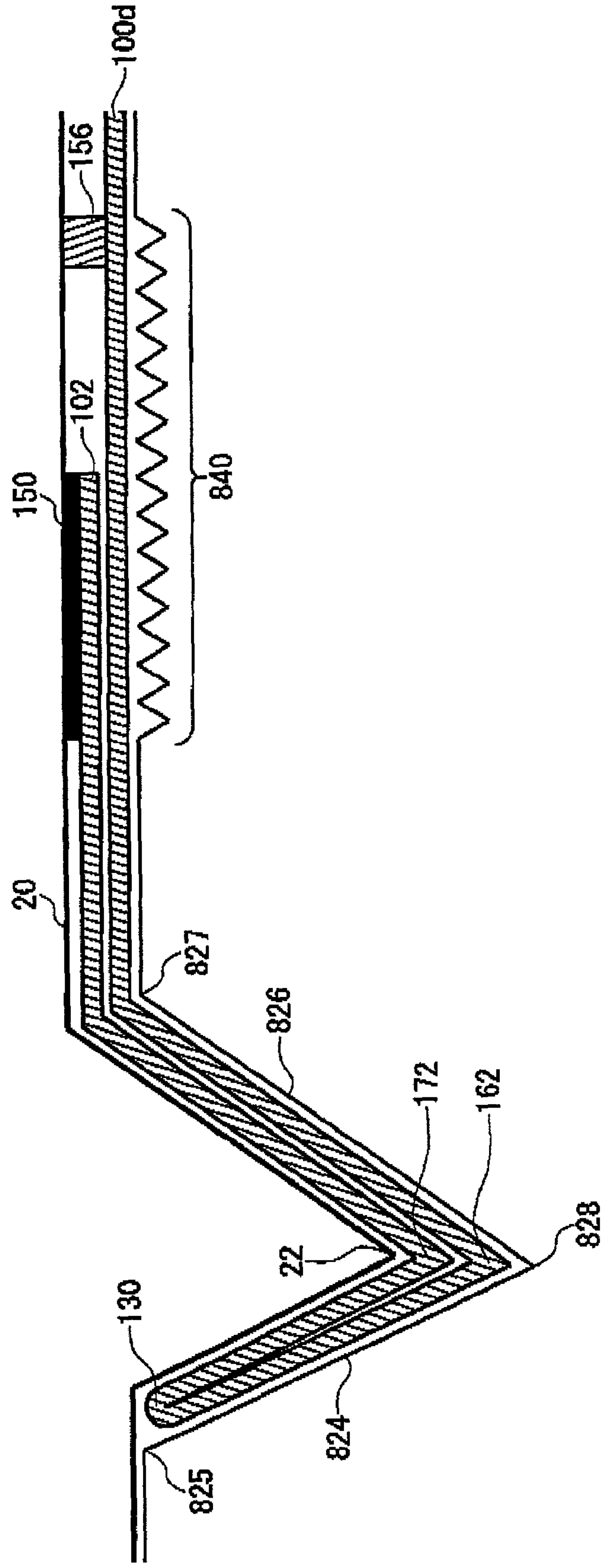
FIG. 26 is an enlarged view of the essential part of FIG. 25.

The convexo-concave part 830 and 840, as illustrated in the essential part enlarged sectional view of FIG. 26, is constructed on the position pressing the first attaching layer 150, the provisional fixing part 156 and the light-shielding paper 20.

The thickness of the adhesive layer of the provisional fixing part 156 is illustrated in this figure to be thicker than that of the first attaching layer 150 and the first attaching part 102, in this case the provisional fixing part 156 can be certainly adhered to the light-shielding paper.

Figure 27:
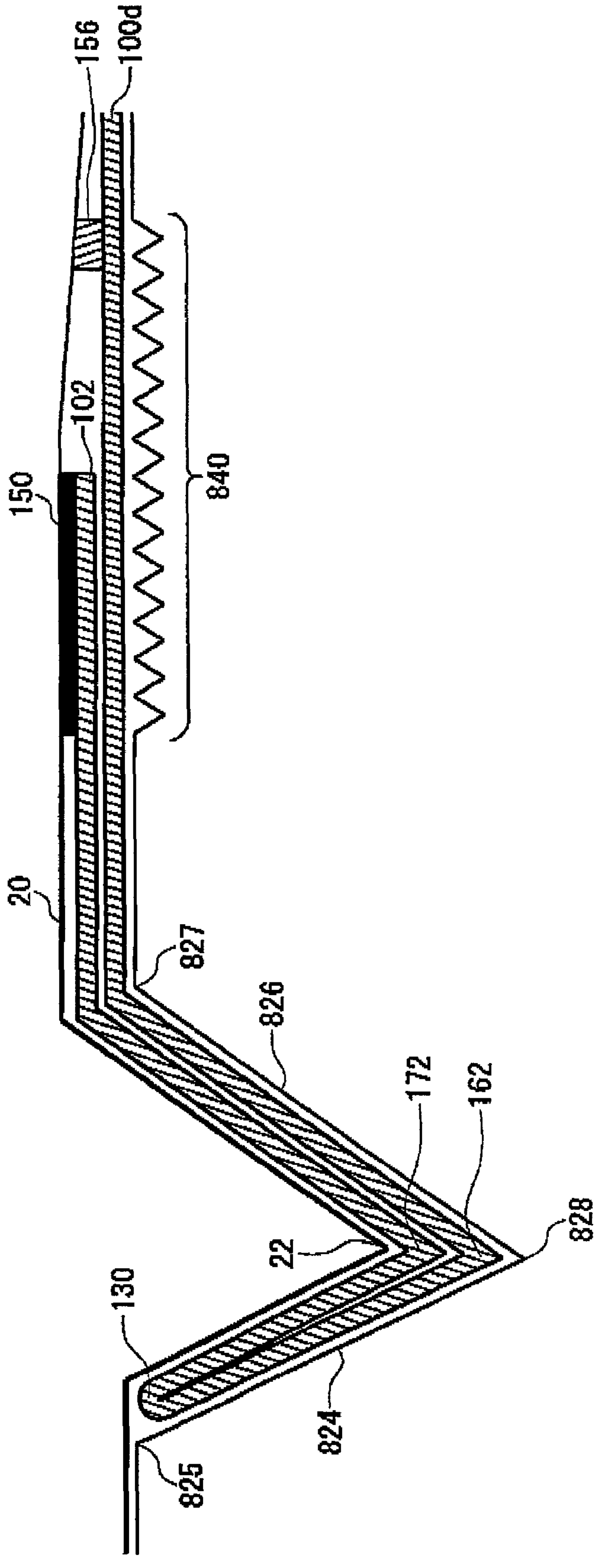
FIG. 27 is another enlarged view of the essential part of FIG. 25.

However, if the thickness of the adhesive layer of the provisional fixing part 156 is illustrated in the essential part enlarged sectional view of FIG. 27 to be thinner than that of the first attaching layer 150 and the first attaching part 102, the provisional fixing part 156 adheres to the light-shielding paper 20 with week adhesion power. At this time, when user withdraws the provisional fixing part 156 from the light-shielding paper 20, the light-shielding paper 20 or the light-shielding paper fastening seal 100*d* don't happen to be damaged.

Even though the first contacting side 812 of the first block 810 and the second contacting side 822 of the second block 820 according to this example are not perfectly parallel with, the first attaching layer 150 and the provisional fixing part 156 are inserted between the first block 810 and the second block 820 together with the light-shielding paper 20 to be pressed on the light-shielding paper 20.

Further, in case of that the first attaching layer 150 and the provisional fixing part 156 have a hot melt adhesive, the heat of the second block 820 is better transmitted to the first attaching layer 150 and the provisional fixing part 156.

Therefore, it could more certainly adhere the first attaching layer 150 to the light-shielding paper 20.

Also, the adhesives or the cohesive agent of the provisional fixing part 156 is thicker than that of the first attaching part 102 and the first attaching layer 150, the provisional fixing part 156 can be provisionally adhere to the light-shielding paper 20 with high possibility.

That is, since the thickness of the adhesive layer of the provisional fixing part 156 can be controlled, the adhesive strength of the provisional fixing part 156 to the light-shielding paper 20 can be controlled.

Figure 28:
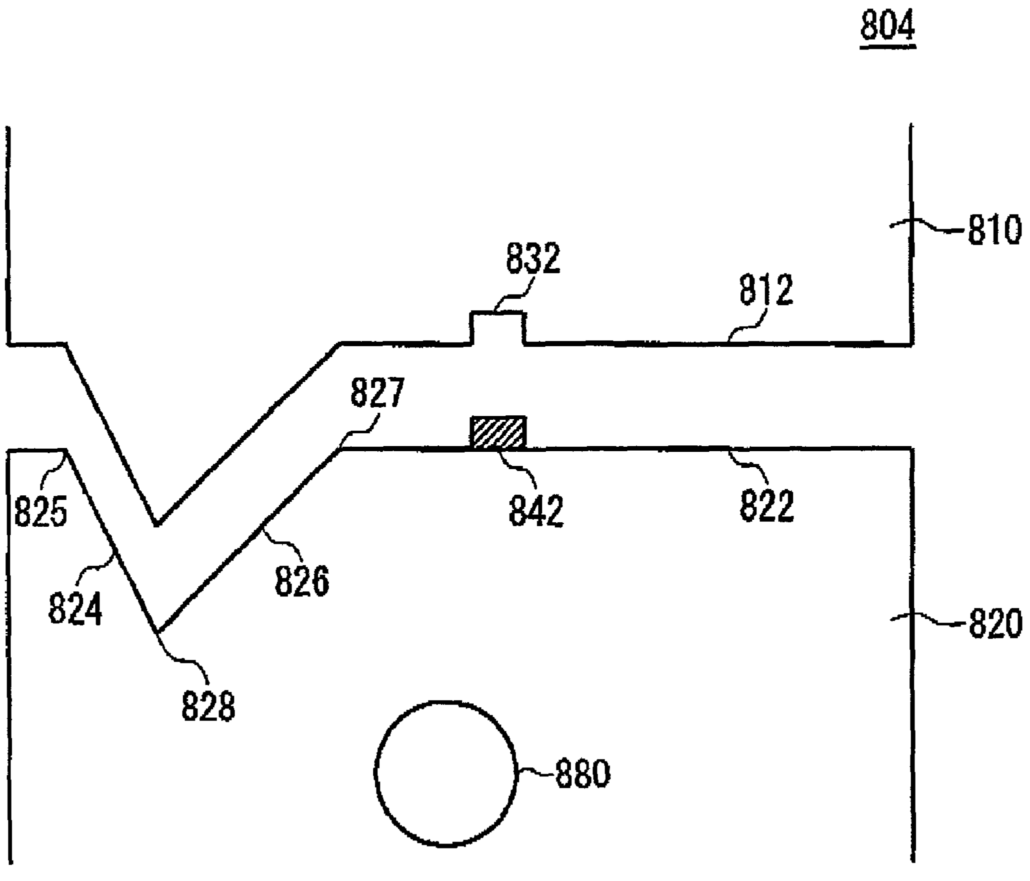
FIG. 28 illustrates the second modified example of the first block and the second block.

According to the forth modified example, as illustrated in the side schematic view of FIG. 28, the convexo-concave part 832 and the convexo-concave part 842 may be constructed on the first contacting side 812 of the first block 810 and the second contacting side 822 of the second block 820 respectively.

The convexo-concave part 832, for example, is consisted of a lock tooth as the sectional side, has the plurality of convexo part in sequence.

The convexo-concave part 842 has the shape corresponding to the convexo-concave part 832, for example, has the plurality of concave part in sequence.

This example has the same effect to the third modified example.

Figure 29:
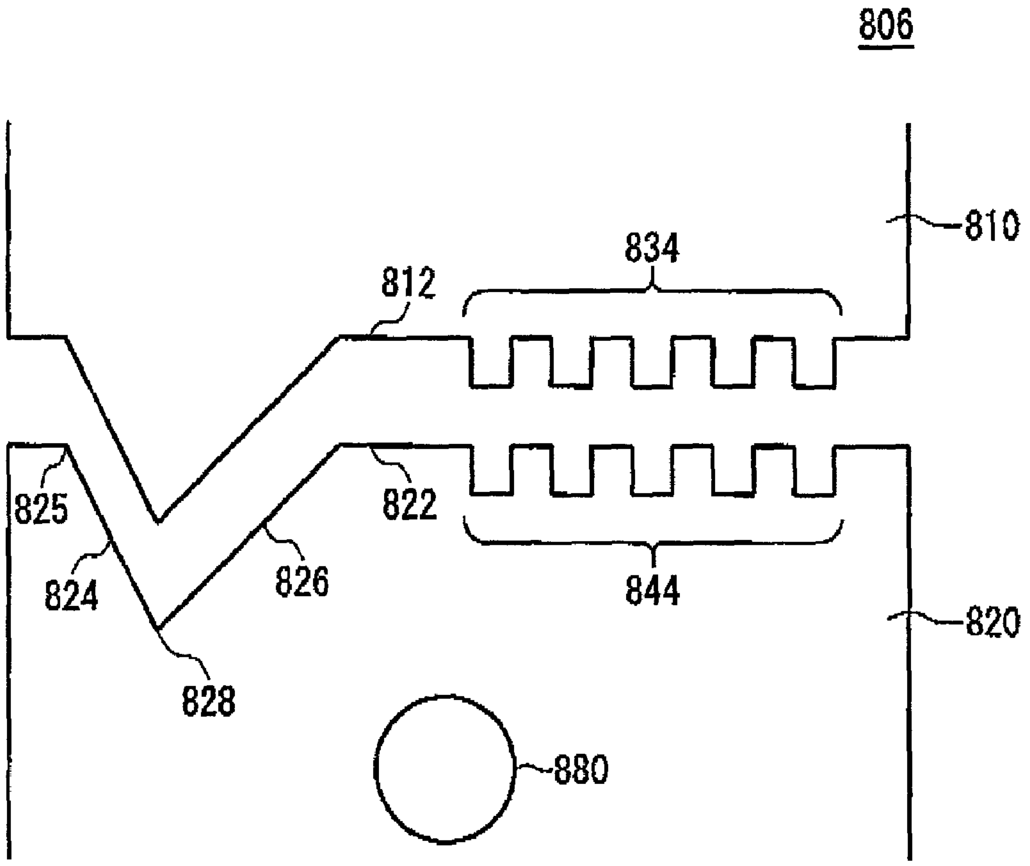
FIG. 29 illustrates the third modified example of the first block and the second block.

According to the fifth modified example, as illustrated in the side schematic view of FIG. 29, the concave part 832 may be constructed on the first contacting side 812 of the first block 810 and the convexo part 842 may be constructed on the second contacting side 822 of the second block 820. The concave part 832 and the convexo part 842 are constructed on the corresponding position to the provisional fixing part 156.

According to this example, even though the adhesives or the cohesive agent of the provisional fixing part 156 is thinner than that of the first attaching part 102 and the first attaching layer 150, the provisional fixing part 156 can be provisionally adhere to the light-shielding paper 20 with high possibility. At this time, since the height of the convexo part 842 can be controlled, the adhesive strength of the provisional fixing part 156 to the light-shielding paper 20 can be controlled.

Figure 30:
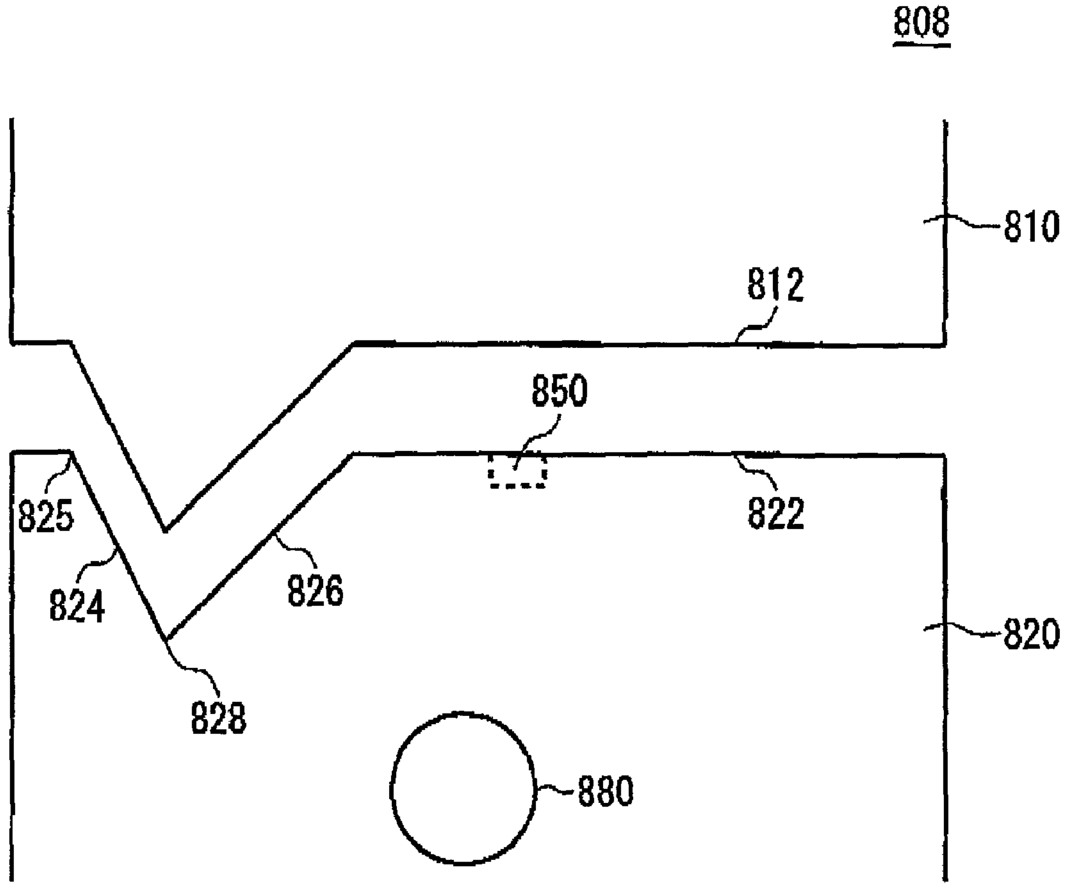
FIG. 30 illustrates the forth modified example of the first block and the second block.
Figure 31:
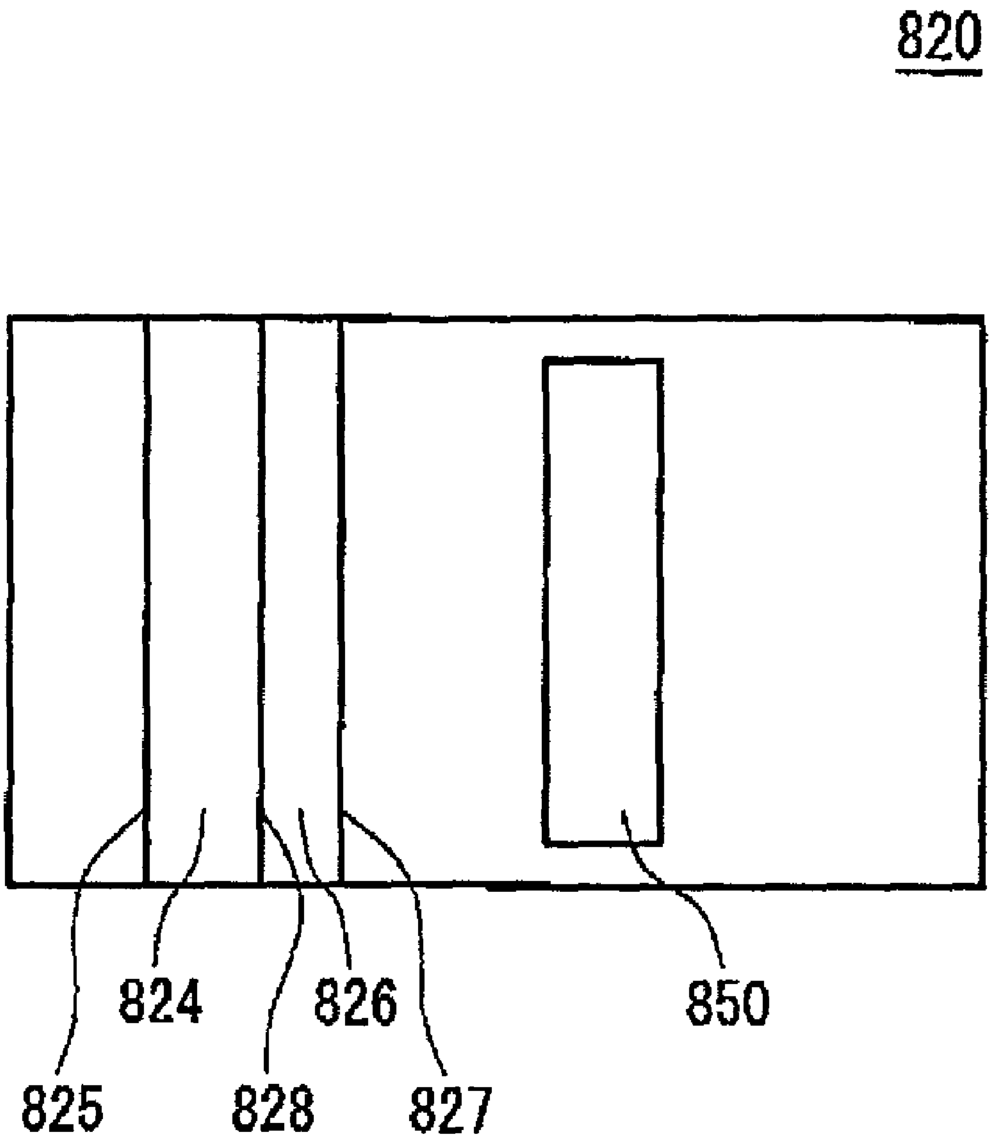
FIG. 31 is a schematic plan view of the second block of FIG. 29.

According to the sixth modified example, as illustrated in the side schematic view of FIG. 30 and the plan schematic view of FIG. 30, the concave part 850 may be constructed on at least any of the first contacting side 812 of the first block 810 and the second contacting side 822 of the second block 820. The concave part 850 is constructed on the corresponding position to the provisional fixing part 156.

According to this example, even though the appropriate section, for example, the whole body of the provisional fixing part 156 has been applied by adhesives or cohesive agents, the corresponding section of the provisional fixing part 156 to the concave part 850 is not pressed into the light-shielding paper 20. And, in case that the provisional fixing part 156 has the hot melt adhesive, the heat is not transmitted up to the corresponding section to the concave part 850. That is, only the partial section to that the adhesives or the cohesive agents is applied in the provisional fixing part 156 provisionally adheres to the light-shielding paper 20.

Therefore, through the shape of the concave part 850 is changed, the shape and the area of the section of the provisional fixing part 156 provisionally adhered to the light-shielding paper 20 can be easily changed.

Further, when the provisional fixing part 156 has the hot melt adhesives, even though the precision of the fixing section of the hot melt adhesives is low, the targeted section of the provisional fixing part 156 can be provisionally adheres to the light-shielding paper 20 easily.

According to the present invention, it is apparent from the above description that the user can be provided the roll photo film that more certainly winds back the light-shielding paper fastening seal. Further, it is possible to more certainly and more easily fasten the photographic film.

Although the present invention has been described by way of exemplary embodiments, it should be understood that those skilled in the art might make many changes and substitutions without departing from the spirit and the scope of the present invention, which is defined only by the appended claims.

What is claimed is:

1. A fastening seal for fixing a wound end of a band-like matter that is wound in a roll form to a body of the band-like matter, the fastening seal comprising:

an attaching part for adhering, wherein said attaching part for adhering is formed on one site of said fastening seal and adheres to fix said fastening seal to an end of the band-like matter, said one site faces to said band-like matter;

an attaching part for fixing, wherein said attaching part for fixing is formed on a site on the same side as said one site and is adhered to the body of the band-like matter for winding and fastening the band-like matter when said attaching part for adhering is adhered to the band-like matter; and a low frictional layer formed at least partially on an outer surface of said fastening seal and configured to provide a lower friction interface between said band-like matter and an outside member attaching to said band-like matter, wherein said low frictional layer is formed at a site different from the site of said attaching part for fixing and said attaching part for adhering, and lubricant is spread on said low frictional layer when said attaching part for adhering is adhered to the band-like matter, wherein the site of said low frictional layer is opposite to said one site when said attaching part for adhering is adhered to the band-like matter.

2. The fastening seal according to claim 1, further comprising a first double-over part, wherein said first double-over part is formed between said attaching part for fixing and said attaching part for adhering, wherein said low frictional layer is formed to cross said first double-over part.

3. The fastening seal according to claim 1, wherein said attaching part for fixing is adhered to the same side of said fastening seal so as to wind and fasten said band-like matter, and said low frictional layer is formed not to overlap with said site to which said attaching part for fixing is adhered.

4. The fastening seal according to claim 1, wherein a thickness of said lubricant on said low frictional layer is from 0.1 μm to 5 μm.

5. The fastening seal according to claim 1, wherein said lubricant contains silicon.

6. The fastening seal according to claim 1, wherein a static friction coefficient between said low frictional layer is 0.160 or less with load of 0.25 $gf/mm^2$.

7. The fastening seal according to claim 1, wherein said band-like matter includes a light-shielding paper which shields a film from light.

8. The fastening seal according to claim 1, wherein said outside member is an inner surface of a camera.

* * * * *